(12) United States Patent
Hoang et al.

(10) Patent No.: US 12,079,733 B2
(45) Date of Patent: Sep. 3, 2024

(54) MULTI-PRECISION DIGITAL COMPUTE-IN-MEMORY DEEP NEURAL NETWORK ENGINE FOR FLEXIBLE AND ENERGY EFFICIENT INFERENCING

(71) Applicant: SanDisk Technologies LLC, Addison, TX (US)

(72) Inventors: Tung Thanh Hoang, San Jose, CA (US); Won Ho Choi, Santa Clara, CA (US); Martin Lueker-Boden, Fremont, CA (US)

(73) Assignee: SanDisk Technologies LLC, Addison, TX (US)

( * ) Notice: Subject to any disclaimer, the term of this patent is extended or adjusted under 35 U.S.C. 154(b) by 1072 days.

(21) Appl. No.: 16/941,178

(22) Filed: Jul. 28, 2020

(65) Prior Publication Data

US 2021/0397974 A1 Dec. 23, 2021

Related U.S. Application Data

(63) Continuation-in-part of application No. 16/908,864, filed on Jun. 23, 2020, now abandoned.

(51) Int. Cl.
*G06F 7/544* (2006.01)
*G06F 12/02* (2006.01)
*G06N 3/10* (2006.01)

(52) U.S. Cl.
CPC ............. *G06N 3/10* (2013.01); *G06F 7/5443* (2013.01); *G06F 12/0238* (2013.01); *G06F 2207/4824* (2013.01); *G06F 2212/72* (2013.01)

(58) Field of Classification Search
CPC . G06F 7/544; G06F 2207/4824; G06N 3/045; G06N 3/063; G06N 3/08

(Continued)

(56) References Cited

U.S. PATENT DOCUMENTS 7,324,366 B2 1/2008 Bednorz et al.
7,505,347 B2 3/2009 Rinerson et al.
(Continued)

FOREIGN PATENT DOCUMENTS

CN 110597555 A 12/2019
CN 110598858 A 12/2019
(Continued)

OTHER PUBLICATIONS

First Action Interview Pilot Program Pre-Interview Communication dated Oct. 7, 2022, U.S. Appl. No. 16/653,365, filed Oct. 15, 2019.
(Continued)

*Primary Examiner* — Tan V Mai
(74) *Attorney, Agent, or Firm* — Vierra Magen Marcus LLP

(57) ABSTRACT

A non-volatile memory structure capable of storing weights for layers of a deep neural network (DNN) and perform an inferencing operation within the structure is presented. An in-array multiplication can be performed between multi-bit valued inputs, or activations, for a layer of the DNN and multi-bit valued weights of the layer. Each bit of a weight value is stored in a binary valued memory cell of the memory array and each bit of the input is applied as a binary input to a word line of the array for the multiplication of the input with the weight. To perform a multiply and accumulate operation, the results of the multiplications are accumulated by adders connected to sense amplifiers along the bit lines of the array. The adders can be configured to multiple levels of precision, so that the same structure can accommodate weights and activations of 8-bit, 4-bit, and 2-bit precision.

18 Claims, 21 Drawing Sheets

(58) Field of Classification Search
USPC .................................................... 708/603
See application file for complete search history.

(56) References Cited

U.S. PATENT DOCUMENTS

| | | | |
|---|---|---|---|
| 8,416,624 | B2 | 4/2013 | Lei et al. |
| 8,634,247 | B1 | 1/2014 | Sprouse et al. |
| 8,634,248 | B1 | 1/2014 | Sprouse et al. |
| 8,773,909 | B2 | 7/2014 | Li et al. |
| 8,780,632 | B2 | 7/2014 | Sprouse et al. |
| 8,780,633 | B2 | 7/2014 | Sprouse et al. |
| 8,780,634 | B2 | 7/2014 | Sprouse et al. |
| 8,780,635 | B2 | 7/2014 | Li et al. |
| 8,792,279 | B2 | 7/2014 | Li et al. |
| 8,811,085 | B2 | 8/2014 | Sprouse et al. |
| 8,817,541 | B2 | 8/2014 | Li et al. |
| 9,098,403 | B2 | 8/2015 | Sprouse et al. |
| 9,104,551 | B2 | 8/2015 | Sprouse et al. |
| 9,116,796 | B2 | 8/2015 | Sprouse et al. |
| 9,384,126 | B1 | 7/2016 | Sprouse et al. |
| 9,430,735 | B1 | 8/2016 | Vali et al. |
| 9,730,735 | B2 | 8/2017 | Mishra et al. |
| 9,887,240 | B2 | 2/2018 | Shimabukuro et al. |
| 9,965,208 | B1 | 5/2018 | Roohparvar et al. |
| 10,127,150 | B2 | 11/2018 | Sprouse et al. |
| 10,249,360 | B1 | 4/2019 | Chang et al. |
| 10,459,724 | B2 | 10/2019 | Yu et al. |
| 10,528,643 | B1 | 1/2020 | Choi et al. |
| 10,535,391 | B2 | 1/2020 | Osada et al. |
| 10,643,119 | B2 | 5/2020 | Chiu et al. |
| 10,643,705 | B2 | 5/2020 | Choi et al. |
| 11,170,290 | B2 | 11/2021 | Hoang et al. |
| 11,328,204 | B2 | 5/2022 | Choi et al. |
| 2014/0133228 | A1 | 5/2014 | Sprouse et al. |
| 2014/0133233 | A1 | 5/2014 | Li et al. |
| 2014/0133237 | A1 | 5/2014 | Sprouse et al. |
| 2014/0136756 | A1 | 5/2014 | Sprouse et al. |
| 2014/0136757 | A1 | 5/2014 | Sprouse et al. |
| 2014/0136758 | A1 | 5/2014 | Sprouse et al. |
| 2014/0136760 | A1 | 5/2014 | Sprouse et al. |
| 2014/0136762 | A1 | 5/2014 | Li et al. |
| 2014/0136763 | A1 | 5/2014 | Li et al. |
| 2014/0136764 | A1 | 5/2014 | Li et al. |
| 2014/0156576 | A1 | 6/2014 | Nugent |
| 2014/0136761 | A1 | 7/2014 | Li et al. |
| 2014/0294272 | A1 | 10/2014 | Madhabushi et al. |
| 2015/0324691 | A1 | 11/2015 | Dropps et al. |
| 2016/0026912 | A1 | 1/2016 | Falcon et al. |
| 2016/0054940 | A1 | 2/2016 | Khoueir et al. |
| 2017/0017879 | A1 | 1/2017 | Kataeva |
| 2017/0054032 | A1 | 2/2017 | Tsukamoto |
| 2017/0098156 | A1 | 4/2017 | Nino et al. |
| 2017/0228637 | A1 | 8/2017 | Santoro et al. |
| 2018/0039886 | A1 | 2/2018 | Umuroglu et al. |
| 2018/0075339 | A1 | 3/2018 | Ma et al. |
| 2018/0082181 | A1 | 3/2018 | Brothers et al. |
| 2018/0144240 | A1 | 5/2018 | Garbin et al. |
| 2018/0315473 | A1 | 11/2018 | Yu et al. |
| 2018/0357533 | A1 | 12/2018 | Inoue |
| 2019/0087715 | A1 | 3/2019 | Jeng |
| 2019/0102359 | A1 | 4/2019 | Knag et al. |
| 2019/0108436 | A1 | 4/2019 | David et al. |
| 2019/0221257 | A1 | 7/2019 | Jeng et al. |
| 2019/0251425 | A1 | 8/2019 | Jaffari et al. |
| 2019/0280694 | A1 | 9/2019 | Obradovic et al. |
| 2020/0034697 | A1 | 1/2020 | Choi et al. |
| 2020/0202203 | A1 | 6/2020 | Nakayama et al. |
| 2020/0234137 | A1 | 7/2020 | Chen et al. |
| 2021/0110244 | A1 | 4/2021 | Hoang et al. |
| 2021/0192325 | A1 | 6/2021 | Hoang et al. |
| 2021/0390112 | A1* | 12/2021 | Ramesh .............. G06F 11/3062 |
| 2021/0406659 | A1* | 12/2021 | Ramesh ................. H03M 1/66 |
| 2022/0100508 | A1 | 3/2022 | Pawlowski |
| 2022/0179703 | A1 | 6/2022 | Vincent |

FOREIGN PATENT DOCUMENTS

| | | | |
|---|---|---|---|
| JP | 2016/042359 A | 3/2016 | |
| KR | 10-2019-009467 | 8/2019 | |
| WO | WO-2022005944 A1 * | 1/2022 | ............... G06F 7/48 |

OTHER PUBLICATIONS

Notice of Allowance dated Oct. 14, 2022, U.S. Appl. No. 16/653,346, filed Oct. 15, 2019.
Resch, Salonik, et al., "PIMBALL: Binary Neural Networks in Spintronic Memory," ACM Trans. Arch. Code Optim., vol. 37, No. 4, Article 111, Aug. 2018, 25 pages.
Zamboni, Prof. Maurizio, et al., "In-Memory Binary Neural Networks," Master's Thesis, Master's Degree in Electronic Engineering, Politechnico Di Torino, Apr. 10, 2019, 327 pages.
Natsui, Masanori, et al., "Design of an energy-efficient XNOR gate based on MTJ-based nonvolatile logic-in-memory architecture for binary neural network hardware," Japanese Journal of Applied Physics 58, Feb. 2019, 8 pages.
Rastegari, Mohammad et al., "XNOR-Net: ImageNet Classification Using Binary Convolutional Neural Networks," proceedings ECCV 2016, Aug. 2016, 55 pages.
Wan, Diwen, et al., "TBN: Convolutional Neural Network with Ternary Inputs and Binary Weights," ECCV 2018, Oct. 2018, 18 pages.
Chen, Yu-Hsin, et al., "Eyeriss: An Energy-Efficient Reconfigurable Accelerator for Deep Convolutional Neural Networks," IEEE Journal of Solid-State Circuits, Feb. 2016, 12 pages.
Sun, Xiaoyu, et al., "Fully Parallel RRAM Synaptic Array for Implementing Binary Neural Network with (+1, −1) Weights and (+1, 0) Neurons," 23rd Asia and South Pacific Design Automation Conference, Jan. 2018, 6 pages. Gonugondla, Sujan K., et al., "Energy-Efficient Deep In-memory Architecture for NAND Flash Memories," IEEE International Symposium on Circuits and Systems (ISCAS), May 2018, 5 pages.
Gonugondla, Sujan K., et al., "Energy-Efficient Deep In-memory Architecture for NAND Flash Memories," IEEE International Symposium on Circuits and Systems (ISCAS), May 2018, 5 pages.
Nakahara, Hiroki, et al., "A Memory-Based Realization of a Binarized Deep Convolutional Neural Network," International Conference on Field-Programmable Technology (FPT), Dec. 2016, 4 pages.
Takeuchi, Ken, "Data-Aware NAND Flash Memory for Intelligent Computing with Deep Neural Network," IEEE International Electron Devices Meeting (IEDM), Dec. 2017, 4 pages.
Mochida, Reiji, et al., "A 4M Synapses integrated Analog ReRAM based 66.5 TOPS/W Neural-Network Processor with Cell Current Controlled Writing and Flexible Network Architecture," Symposium on VLSI Technology Digest of Technical Papers, Jun. 2018, 2 pages.
Chiu, Pi-Feng, et al., "A Differential 2R Crosspoint RRAM Array With Zero Standby Current," IEEE Transactions on Circuits and Systems—II: Express Briefs, vol. 62, No. 5, May 2015, 5 pages.
Chen, Wei-Hao, et al., "A 65nm 1Mb Nonvolatile Computing-in-Memory ReRAM Macro with Sub-16ns Mulitply-and-Accumulate for Binary DNN AI Edge Processors," IEEE International Solid-State Circuits Conference, Feb. 2018, 3 pages.
Liu, Rui, et al., "Parallelizing SRAM Arrays with Customized Bit-Cell for Binary Neural Networks," DAC '18, Jun. 2018, 6 pages.
Courbariaux, Matthieu, et al., "Binarized Neural Networks: Training Neural Networks with Weights and Activations Constrained to +1 or −1," arXiv.org, Mar. 2016, 11 pages.
U.S. Appl. No. 62/702,713, filed Jul. 24, 2018.
U.S. Appl. No. 16/368,441, filed Mar. 28, 2019.
U.S. Appl. No. 16/653,346, filed Oct. 15, 2019.
U.S. Appl. No. 16/653,365, filed Oct. 15, 2019.
Simon, Noah, et al., "A Sparse-Group Lasso," Journal of Computational and Graphical Statistics, vol. 22, No. 2, pp. 231-245, downloaded by Moskow State Univ. Bibliote on Jan. 28, 2014.

(56) References Cited

OTHER PUBLICATIONS

CS231n Convolutional Neural Networks for Visual Recognition, [cs231.github.io/neural-networks-2/#reg], downloaded on Oct. 15, 2019, pp. 1-15.

Krizhevsky, Alex, et al., "ImageNet Classification with Deep Convolutional Neural Networks," [http://code.google.com/p/cuda-convnet/], downloaded on Oct. 15, 2019, 9 pages.

Shafiee, Ali, et al., "ISAAC: A Convolutional Neural Network Accelerator with In-Situ Analog Arithmetic in Crossbars," ACM/IEEE 43rd Annual International Symposium on Computer Architecture (ISCA), Oct. 5, 2016, 13 pages.

Han, Song, et al., "Learning both Weights and Connections for Efficient Neural Networks," Conference paper, NIPS, Oct. 2015, 9 pages.

Jia, Yangqing, "Learning Semantic Image Representations at a Large Scale," Electrical Engineering and CS, University of Berkeley, Technical Report No. UCB/EECS-2014-93, May 16, 2014, 104 pages.

Wen, Wei, et al., "Learning Structured Sparsity in Deep Neural Networks," 30th Conference on Neural Information Processing Systems (NIPS 2016), Nov. 2016, 9 pages.

Wang, Peiqi, et al., "SNrram: An Efficient Sparse Neural Network Computation Architecture Based on Resistive Random-Access Memory," DAC '18, Jun. 24-29, 2018, 6 pages.

Zheng, Shixuan, et al., "An Efficient Kernel Transformation Architecture for Binary-and Ternary-Weight Neural Network Inference," DAC' 18, Jun. 24-29, 2018, 6 pages.

Notice of Allowance dated Feb. 20, 2020, U.S. Appl. No. 16/405,178, filed May 7, 2019.

Notice of Allowance dated Mar. 11, 2020, U.S. Appl. No. 16/414,143, filed May 16, 2019.

Baugh, Charles R., et al., "A Two's Complement Parallel Array Multiplication Algorithm," IEEE Transactions on Computers, vol. C-22, No. 12, Dec. 1973, 3 pages.

Hoang, Tung Thanh, et al., "Data-Width-Driven Power Gating of Integer Arithmetic Circuits," IEEE Computer Society Annual Symposium on VLSI, Jul. 2012, 6 pages.

Choi, Won Ho, et al., "High-precision Matrix-Vector Multiplication Core using Binary NVM Cells," Powerpoint, Western Digital Research, downloaded on Jun. 15, 2020, 7 pages.

Ni, Leibin, et al., "An Energy-Efficient Digital ReRAM-Crossbar-Based CNN With Bitwise Parallelism," IEEE Journal of Exploratory Solid-State Computational Devices and Circuits, May 2017, 10 pages.

Zhou, Shuchang, et al., "DoReFa-Net: Training Low Bitwidth Convolutional Neural Networks with Low Bitwidth Gradients," [arXiv.org > cs > arXiv:1606.06160], Feb. 2, 2018, 13 pages.

U.S. Appl. No. 16/908,864, filed Jun. 23, 2020.

Notice of Allowance dated Jan. 24, 2022, U.S. Appl. No. 16/368,347, filed Mar. 28, 2019.

Notice of Allowance dated Feb. 8, 2023, U.S. Appl. No. 16/901,302, filed Jun. 15, 2020.

International Search Report & the Written Opinion of the International Searching Authority dated Sep. 11, 2020, International Application No. PCT/US2020/024625.

English Abstract of JP Publication No. JP2016/042359 published Mar. 31, 2016.

International Search Report & the Written Opinion of the International Searching Authority dated Jul. 30, 2020, International Application No. PCT/US2020/024615.

Chiu, Pi-Feng, et al., "A Binarized Neural Network Accelerator with Differential Crosspoint Memristor Array for Energy-Efficient MAC Operations," 2019 IEEE International Symposium on Circuits and Systems (ISCAS), May 2019, Abstract only.

Sun, Xiaoyu, et al., "Low-VDD Operation of SRAM Synaptic Array for Implementing Ternary Network," IEEE Transactions on Very Large Scale Integration (VLSI) Systems, vol. 25, No. 10, Jul. 2017, Abstract only.

Kim, Hyeonuk, et al., "NAND-Net: Minimizing Computational Complexity of In-Memory Processing for Binary Neural Networks," 2019 IEEE International Symposium on High Performance Computer Architecture (HPCA), Mar. 2019, Abstract only.

English Abstract of KR Publication No. KR 10-2019-0094679 published Aug. 14, 2019.

U.S. Appl. No. 16/901,302, filed Jun. 15, 2020.

International Search Report & the Written Opinion of the International Searching Authority dated Jul. 9, 2020, International Application No. PCT/US2020/024612.

Houxiang Ji, et al., "RECOM: An Efficient Resistive Accelerator for Compressed Deep Neural Networks, " in 2018 Design, Automation & Test in Europe Conference & Exhibition, Mar. 23, 2018, Abstract only.

Yang, Tzu-Hsien, et al., "Sparse ReRAM Engine: Joint Exploration of Activation and Weight Sparsity in Compressed Neural Networks," Computer Architecture, pp. 236-249, Jun. 26, 2019, Abstract only.

Notice of Allowance dated Jul. 12, 2021, U.S. Appl. No. 16/368,441, filed Mar. 28, 2019.

Kim, Hyeonuk, et al., "NAND-Net: Minimizing Computational Complexity of In-Memory Processing for Binary Neural Networks," 2019 IEEE International Symposium on High Performance Computer Architecture (HPCA), Mar. 2019.

Ji, H., et al., "ReCOM: An efficient resistive accelerator for compressed deep neural networks," 2018 Design, Automation & Test in Europe Conference & Exhibition, 2018, pp. 237-240.

Non-final Office Action dated Jun. 23, 2022, U.S. Appl. No. 16/653,346, filed Oct. 15, 2019.

Restriction Requirement dated May 26, 2022, U.S. Appl. No. 16/653,365, filed Oct. 15, 2019.

Response to Restriction Requirement dated Aug. 24, 2022, U.S. Appl. No. 16/653,365, filed Oct. 15, 2019.

Response to Office Action dated Sep. 8, 2022, U.S. Appl. No. 16/653,346, filed Oct. 15, 2019.

Non-final Office Action dated Sep. 15, 2022, U.S. Appl. No. 16/901,302, filed Jun. 15, 2020.

\* cited by examiner

| Case | Input logic | WL voltage ($V_{IN}$) | Weight Logic | Weight ($V_{th}$) | Discharge current (on BL) | SA output voltage | Expected AND output |
|---|---|---|---|---|---|---|---|
| 1 | 0 | $V_{PASS}$ | 0 | low $V_{th}$ | $I_{PASS}$ | 0 | 0 |
| 2 | 0 | $V_{PASS}$ | 1 | high $V_{th}$ | $I_{PASS}$ | 0 | 0 |
| 3 | 1 | $V_{READ}$ | 0 | low $V_{th}$ | $I_{READ}$ | 0 | 0 |
| 4 | 1 | $V_{READ}$ | 1 | high $V_{th}$ | X | 1 | 1 |

| Case | Input logic | WL voltage ($V^{IN}$) | Weight logic | Cell state | Discharge current (on BL) | SA output voltage | Expected AND output |
|---|---|---|---|---|---|---|---|
| 1 | 0 | 0 | 0 | HRS | $I^{LEAK}$ | 0 | 0 |
| 2 | 0 | 0 | 1 | LRS | $I^{LEAK}$ | 0 | 0 |
| 3 | 1 | V | 0 | HRS | small $I^{CELL}$ | 0 | 0 |
| 4 | 1 | V | 1 | LRS | large $I^{CELL}$ | 1 | 1 |

Figure 16

| $M^{2:0}$ | Mode | | Activation ($B_A$)/Weight ($B_W$) | | | Shifter |
|---|---|---|---|---|---|---|
| 3'b111 | Full Precision | FP | 1x16b MAC | 1x8b weight | 1x8b activation | 1 x 16-bit |
| 3'b101 | Half Precision | HP | 2x 8b MAC | 2x4b weight | 2x2b activation | 2 x 8-bit |
| 3'b000 | Quarter Precision | QP | 4x 4b MAC | 4x2b weight | 4x2b activation | 4 x 4-bit |

Figure 19

MULTI-PRECISION DIGITAL COMPUTE-IN-MEMORY DEEP NEURAL NETWORK ENGINE FOR FLEXIBLE AND ENERGY EFFICIENT INFERENCING

CLAIM OF PRIORITY

This application is a continuation-in-part application of U.S. patent application Ser. No. 16/908,864, entitled "MULTI-PRECISION DIGITAL COMPUTE-IN-MEMORY DEEP NEURAL NETWORK ENGINE FOR FLEXIBLE AND ENERGY EFFICIENT INFERENCING," filed Jun. 23, 2020, and incorporated by reference herein in its entirety.

BACKGROUND

Artificial neural networks are finding increasing usage in artificial intelligence and machine learning applications. In an artificial neural network, a set of inputs is propagated through one or more intermediate, or hidden, layers to generate an output. The layers connecting the input to the output are connected by sets of weights that are generated in a training or learning phase by determining a set of a mathematical manipulations to turn the input into the output, moving through the layers calculating the probability of each output. Once the weights are established, they can be used in the inference phase to determine the output from a set of inputs. Although such neural networks can provide highly accurate results, they are extremely computationally intensive, and the data transfers involved in reading the weights connecting the different layers out of memory and transferring these weights into the processing units of a processing unit can be quite intensive.

BRIEF DESCRIPTION OF THE DRAWING

Like-numbered elements refer to common components in the different figures.

In some embodiments, the Front End Processor Circuit is part of a Controller.

Figure 3:
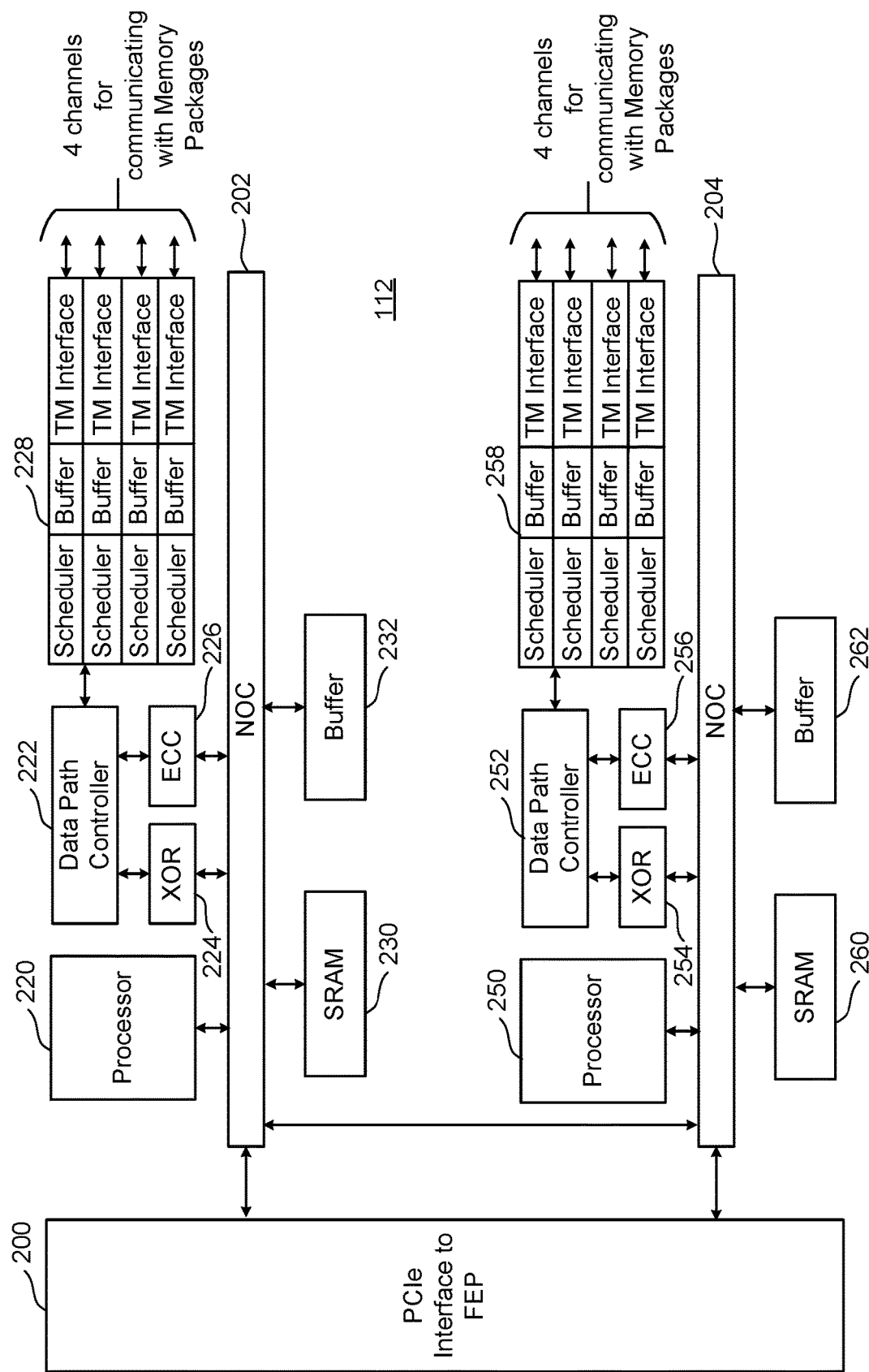

FIG. 3 is a block diagram of one embodiment of a Back End Processor Circuit.

In some embodiments, the Back End Processor Circuit is part of a Controller.

Figure 4:
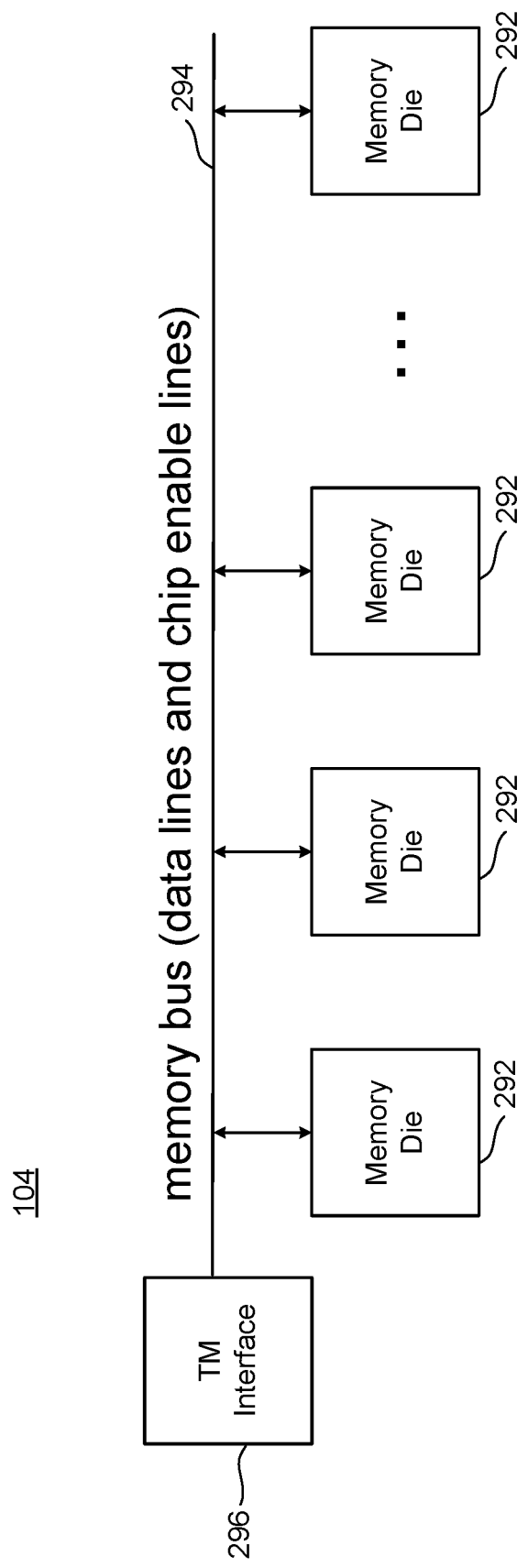

FIG. 4 is a block diagram of one embodiment of a memory package.

Figure 5:
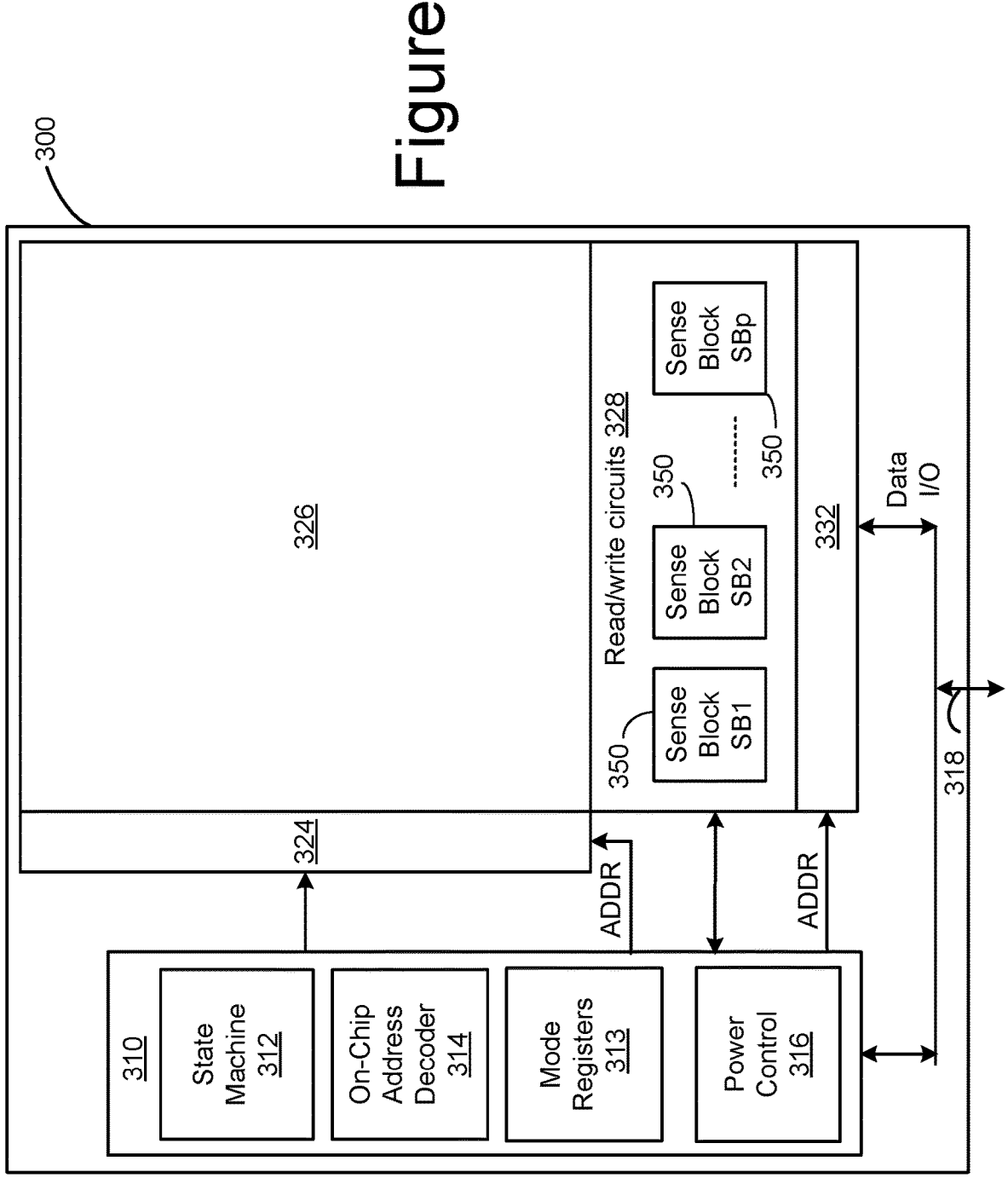

FIG. 5 is a block diagram of one embodiment of a memory die.

Figure 6A:
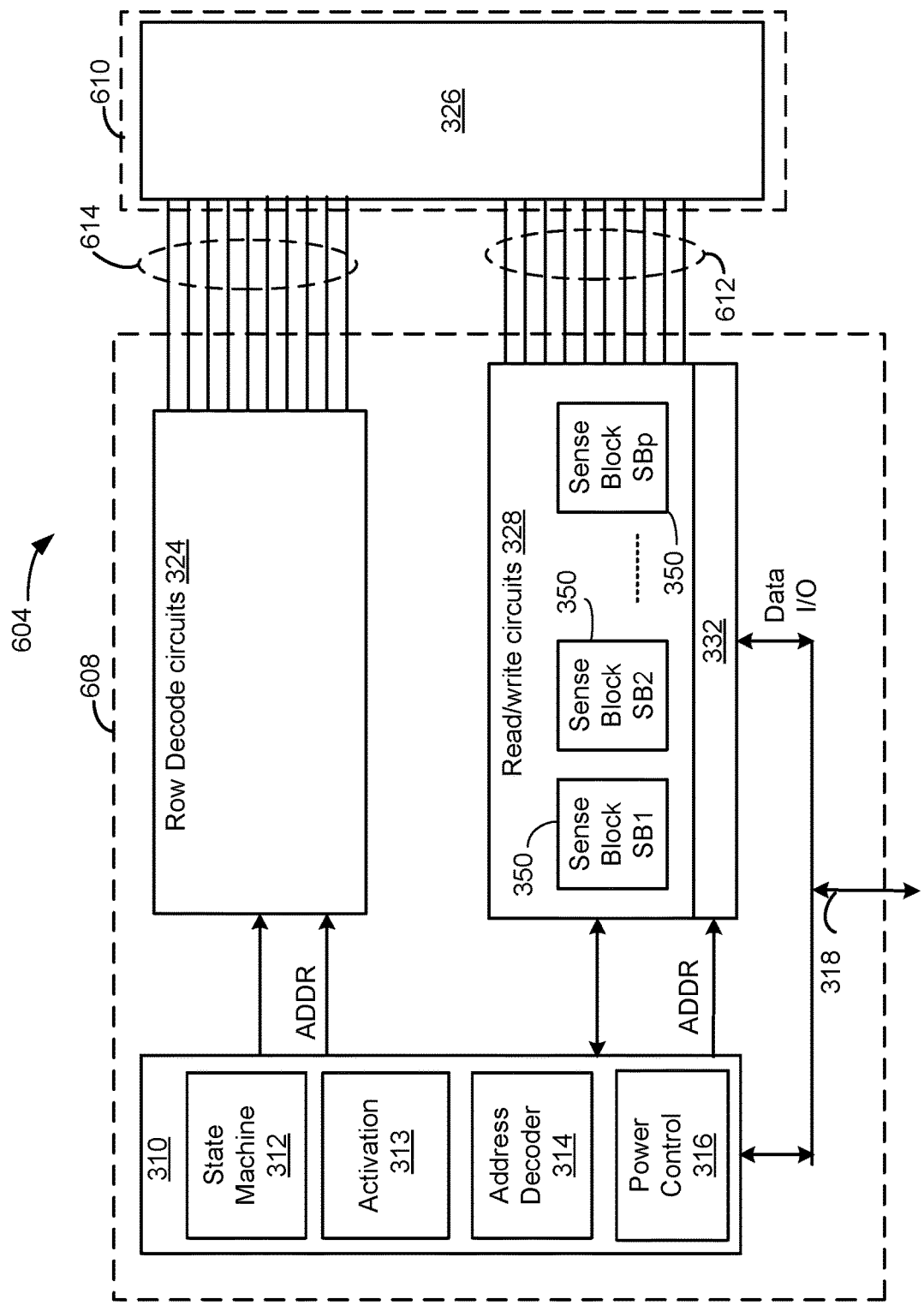
Figure 6B:
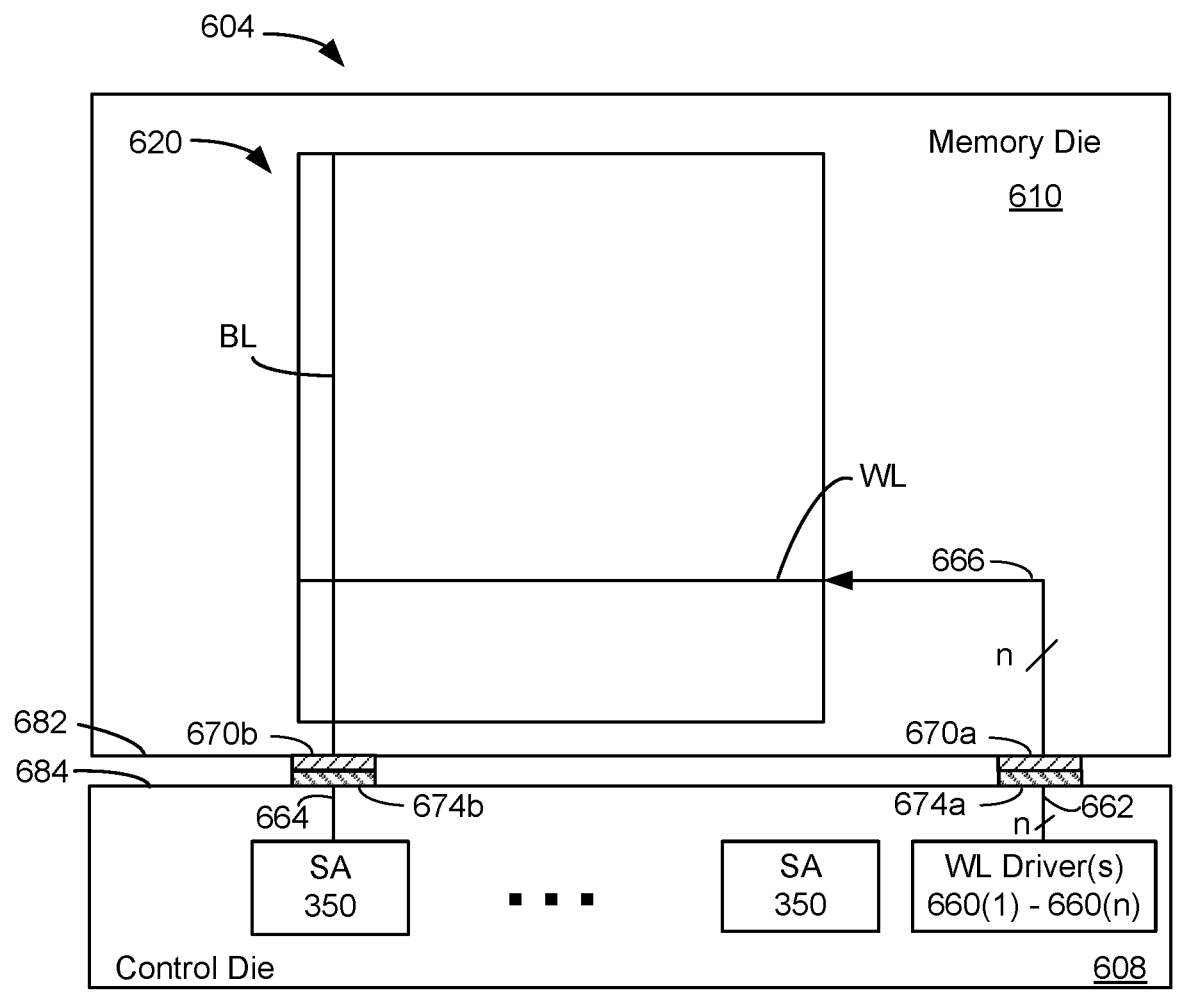

FIGS. 6A and 6B illustrate an example of control circuits coupled to a memory structure through wafer-to-wafer bonding.

Figure 7:
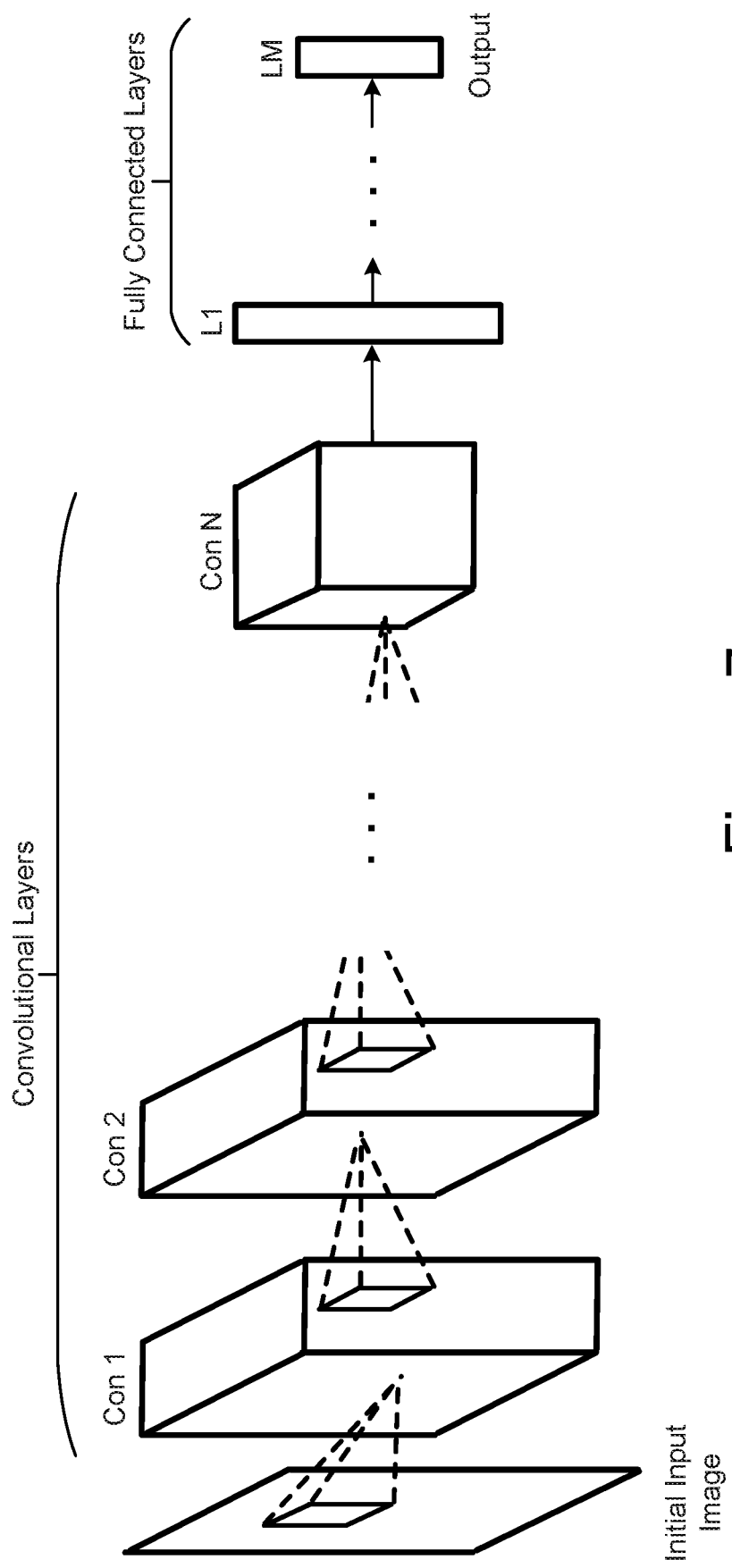

FIG. 7 illustrates a simple example of a convolutional neural network (CNN).

Figure 8:
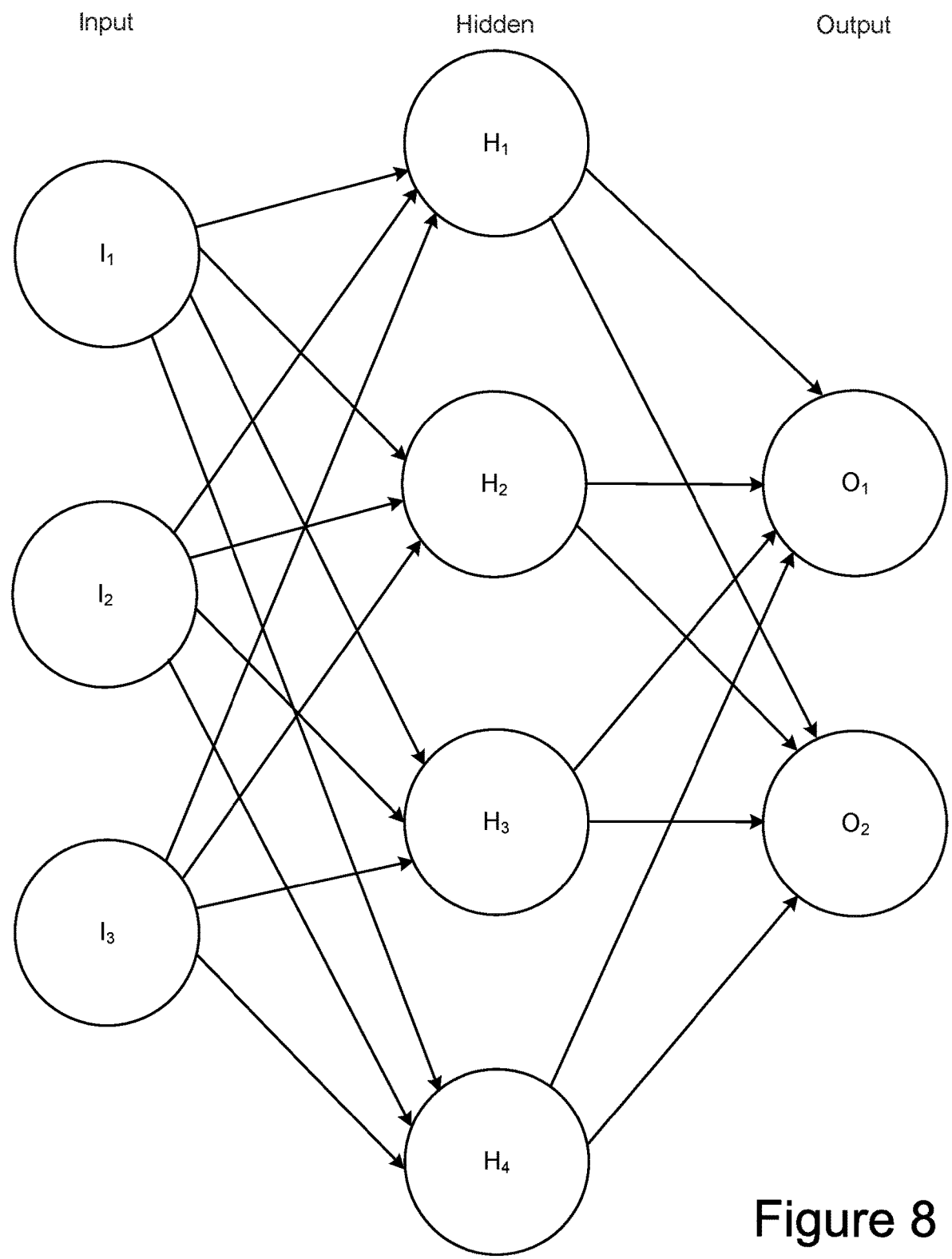

FIG. 8 illustrates a simple example of fully connected layers in an artificial neural network.

Figure 9B:
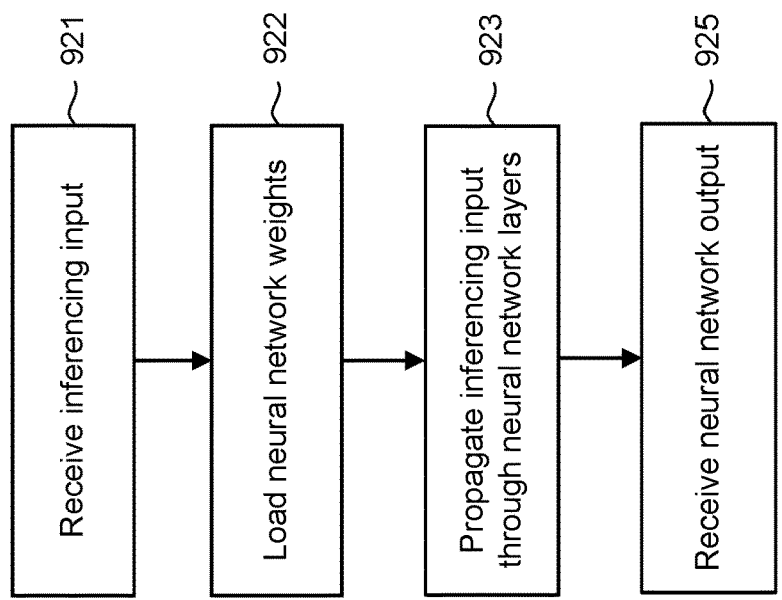
Figure 9A:
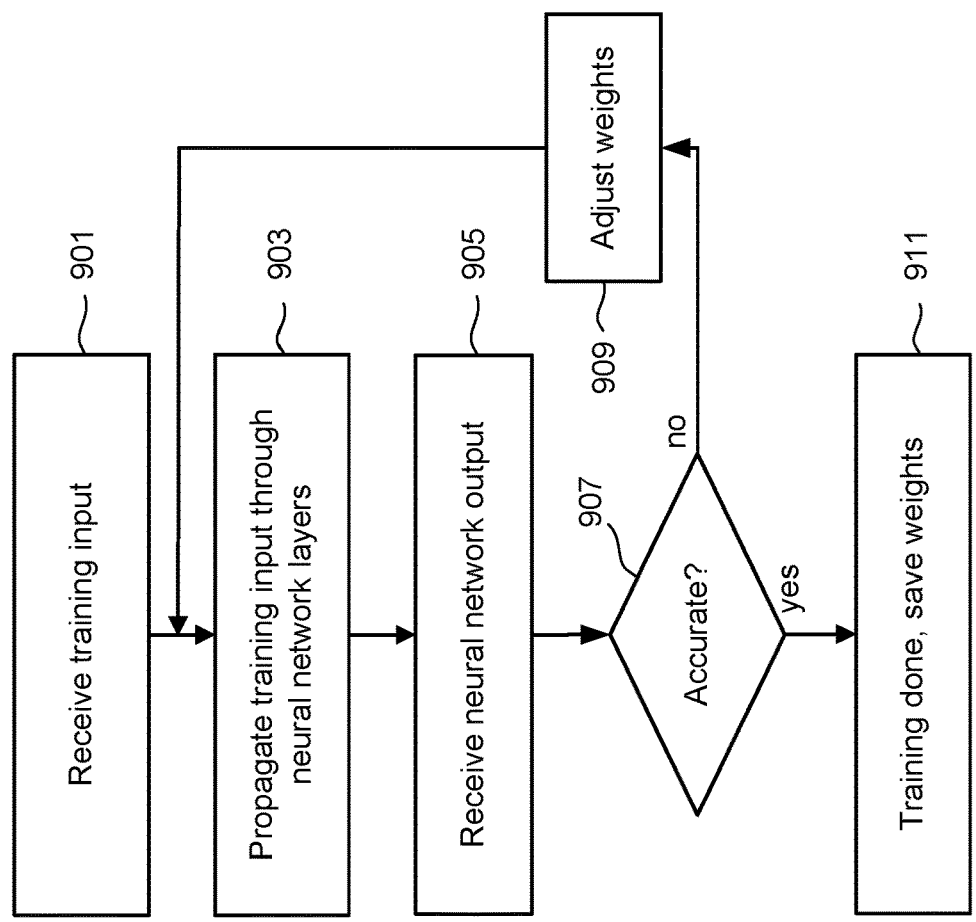

FIG. 9A is a flowchart describing one embodiment of a process for training a neural network to generate a set of weights.

FIG. 9B is a flowchart describing one embodiment of a process for inference using a neural network.

Figure 10:
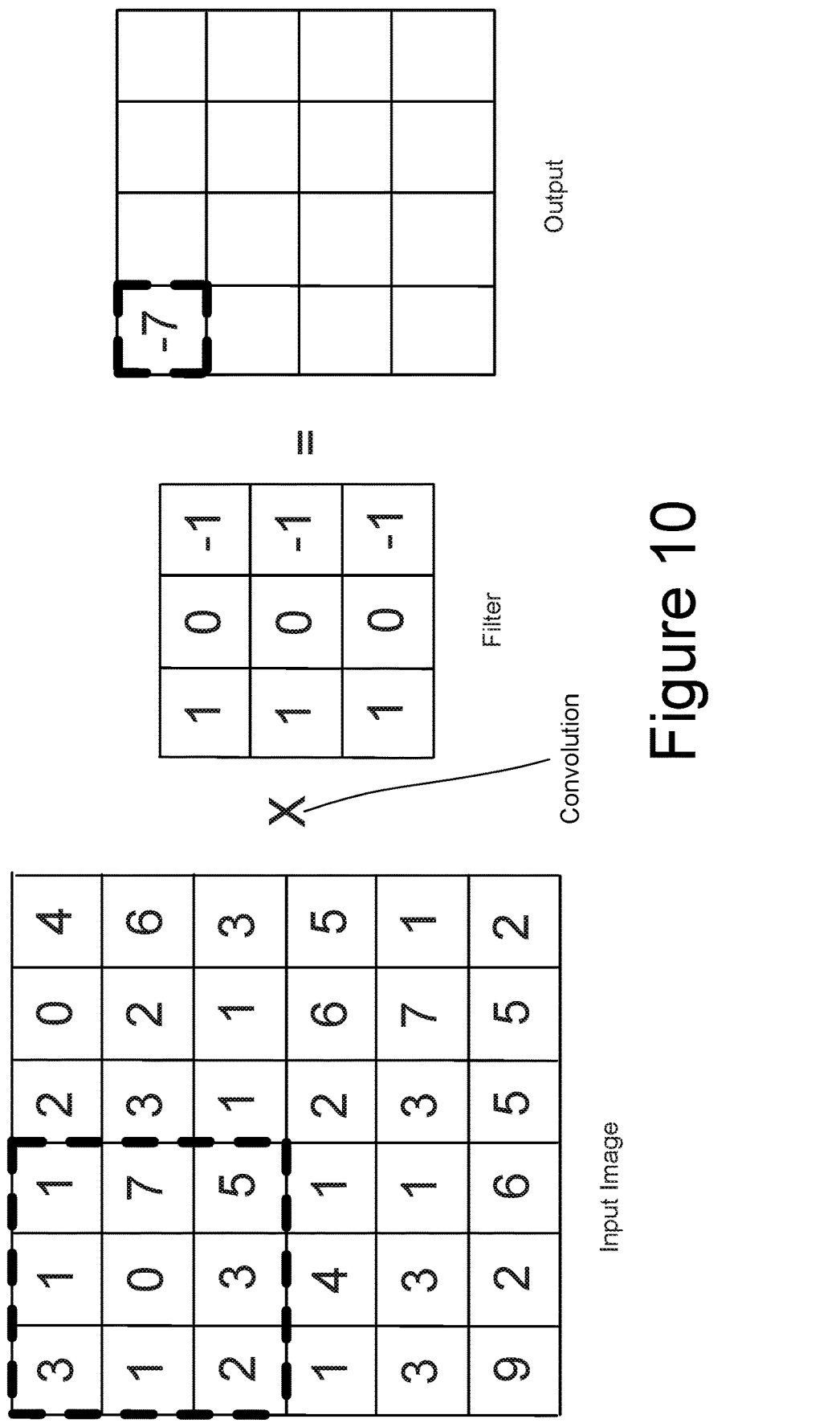

FIG. 10 is a schematic representation of a convolution operation in a convolutional neural network.

Figure 11:
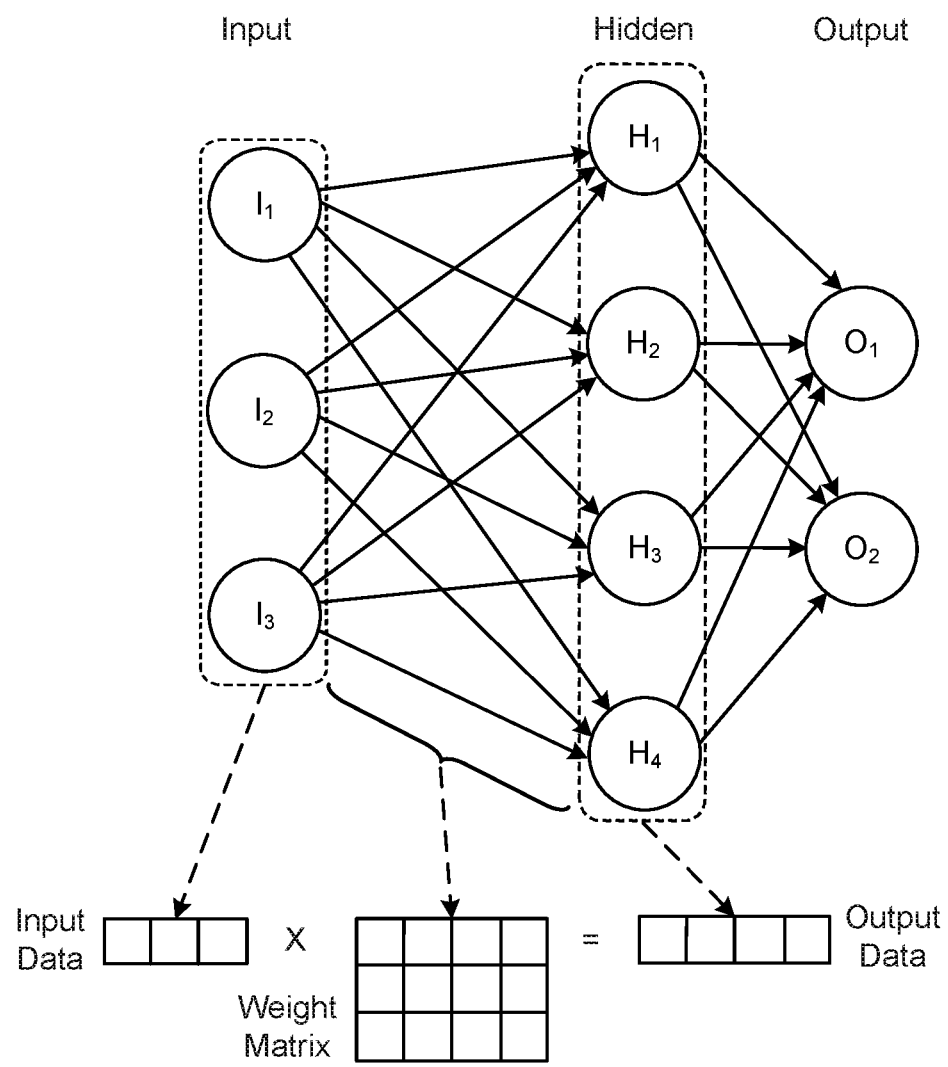

FIG. 11 is a schematic representation of the use of matrix multiplication in a fully connected layer of a neural network.

Figure 12:
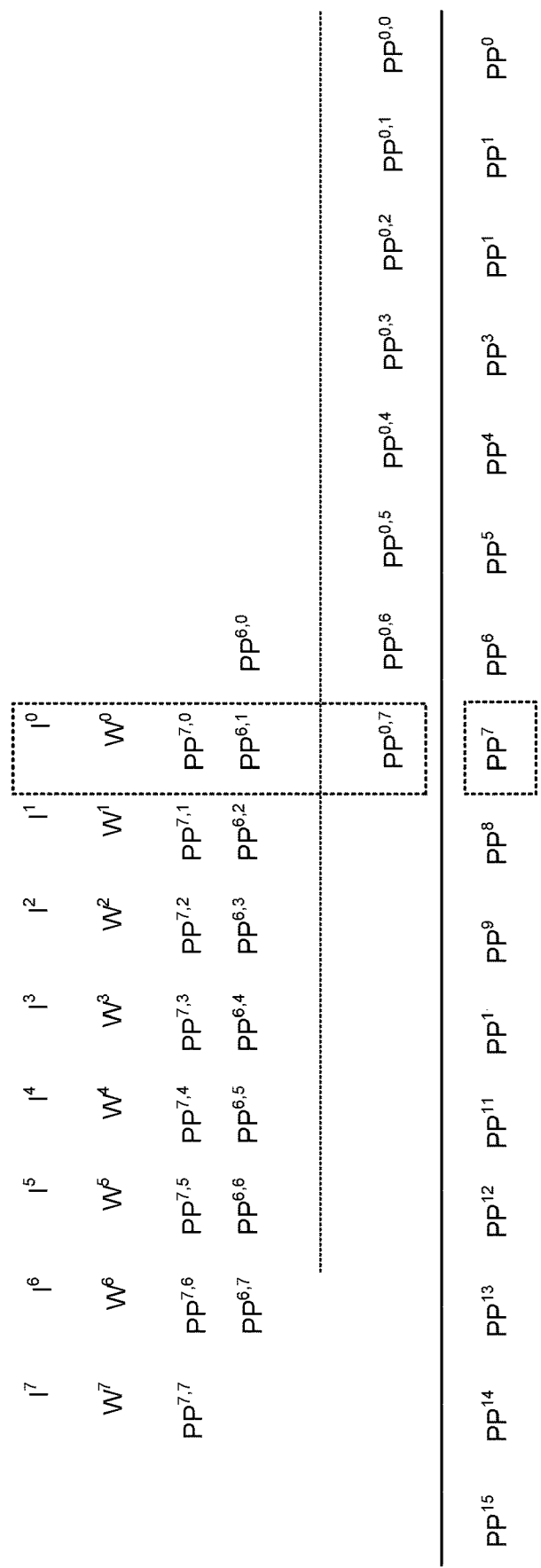

FIG. 12 is a schematic representation of the unsigned multiplication of the bits of a component of the input (or activation) matrix and a component of the weight matrix.

Figure 13:
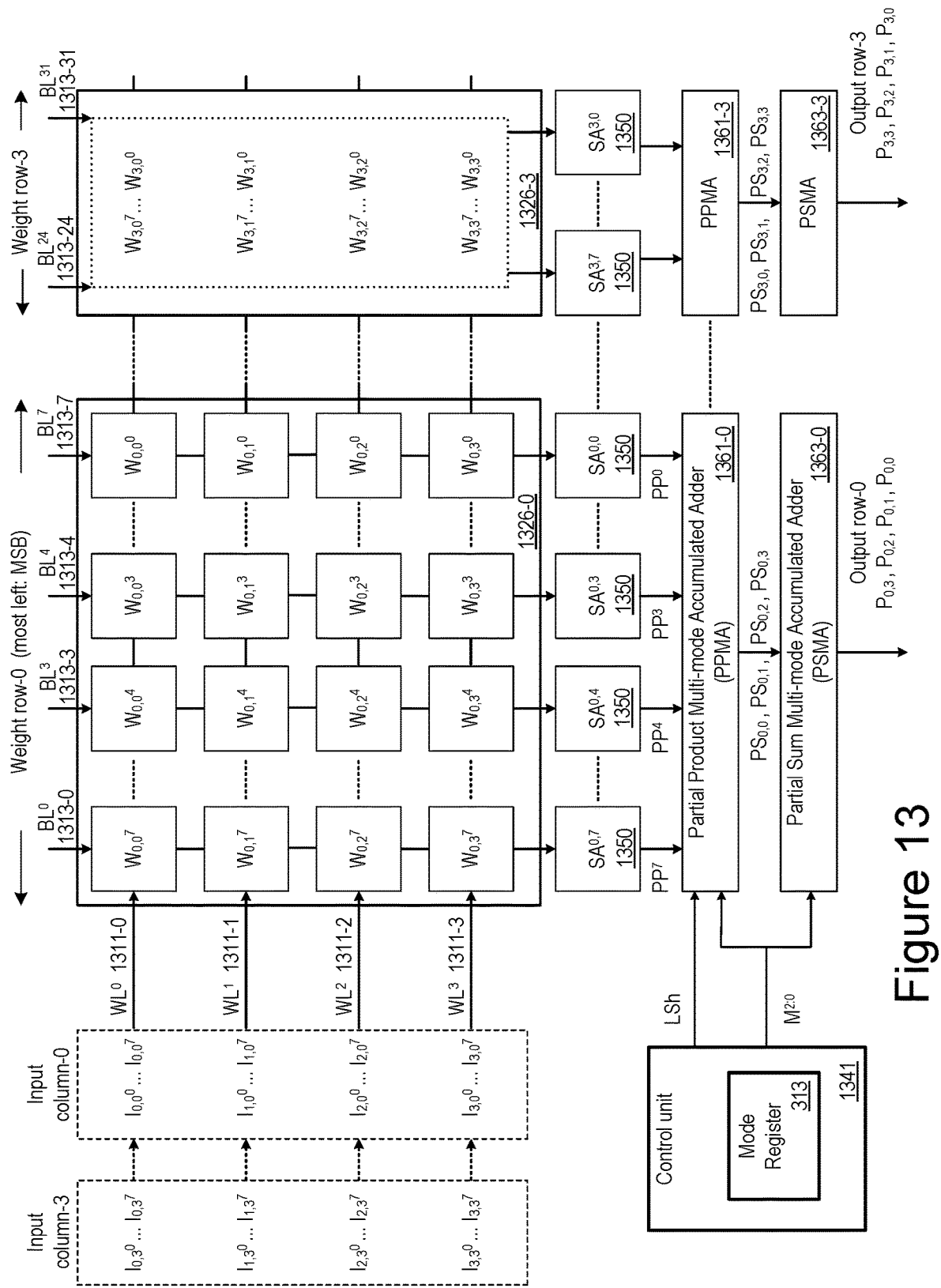

FIG. 13 illustrates an embodiment of a non-volatile memory array for multi-precision compute in memory operations for a DNN.

Figures 14, 15:
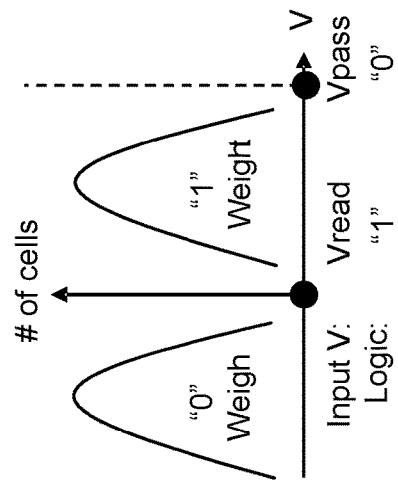
Figure 17:
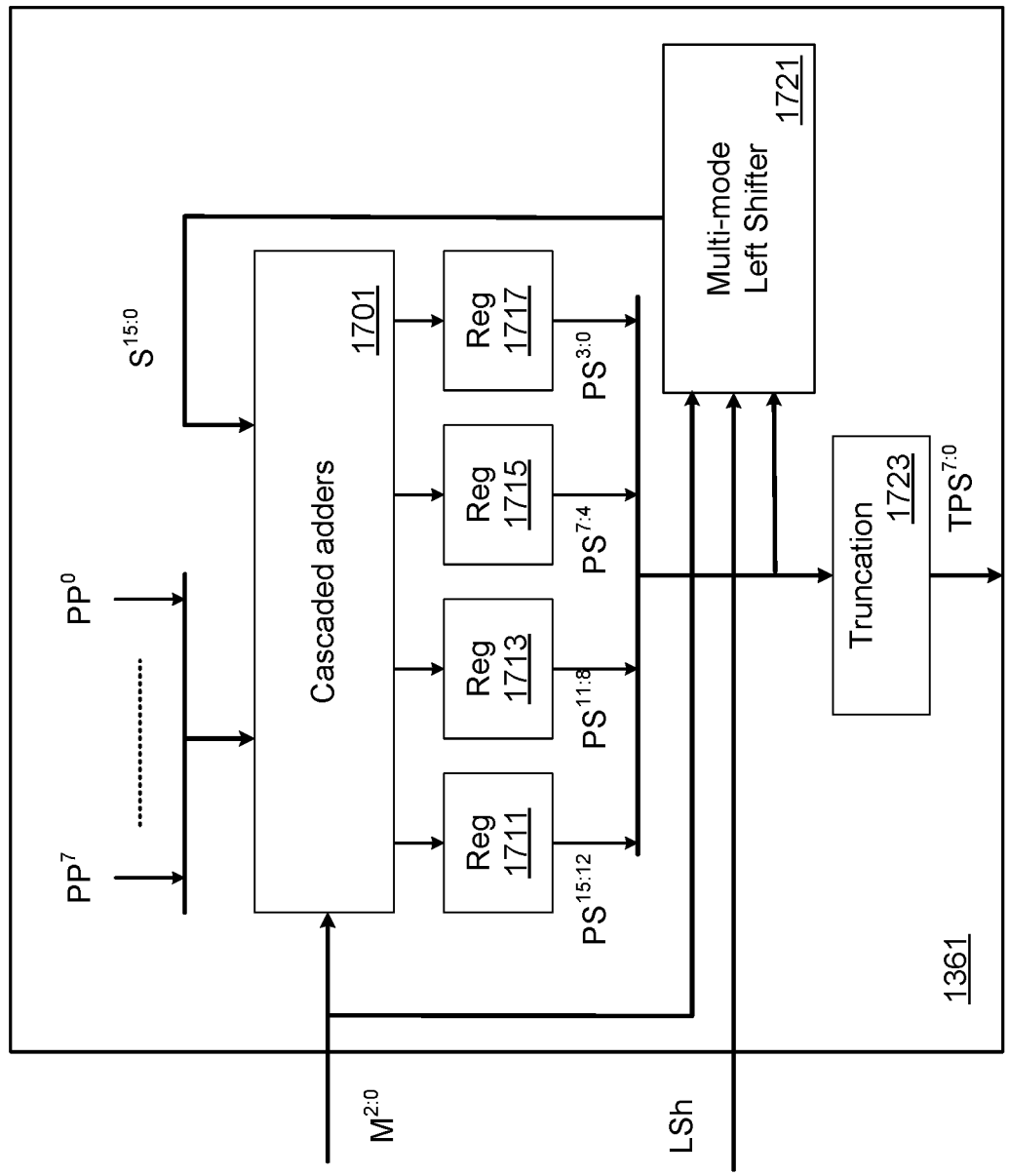

FIG. 14 is table illustrating the operation of a NAND flash memory cell for implementing the AND logic for an in-array multiplication.

FIG. 15 illustrates the relation of input voltage and threshold voltages for NAND memory cells.

FIG. 16 is table illustrating the operation of storage class memory (SCM) cell for implementing the AND logic in-array multiplication for a compute-in-memory DNN.

FIGS. 17-20 consider an embodiment for the Partial Product Multi-mode accumulate Adder (PPMA) of FIG. 13 in more detail.

Figure 21:
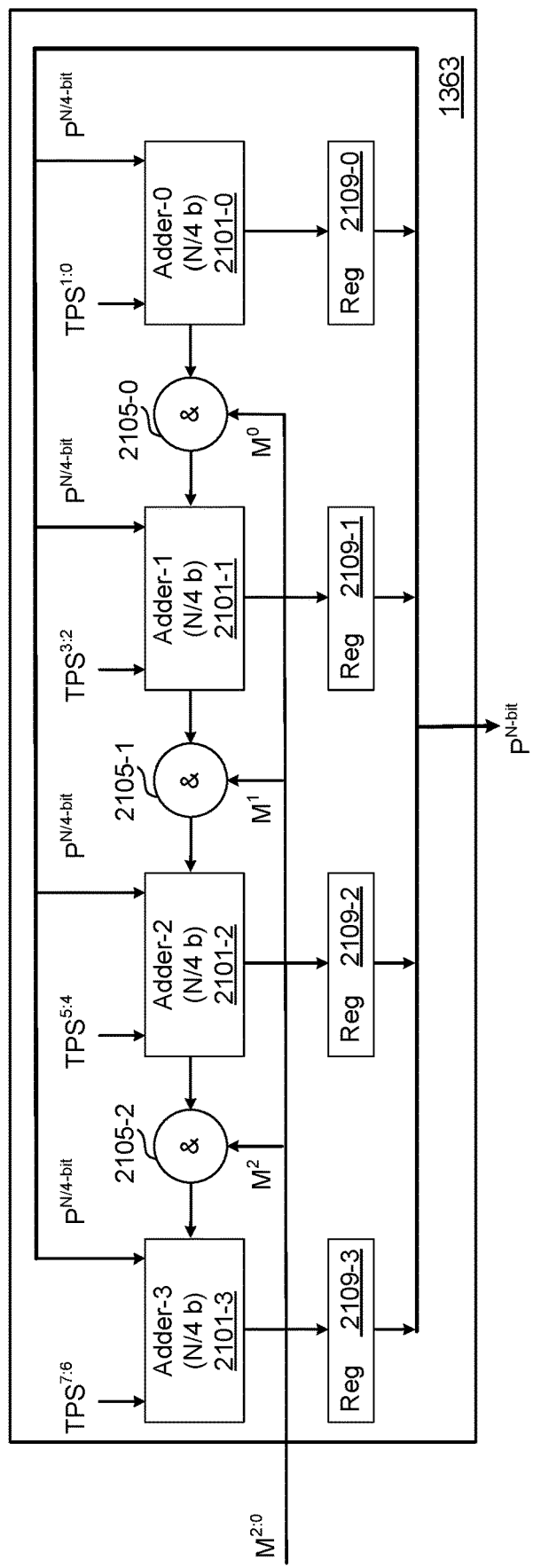

FIG. 21 is a block diagram for one embodiment of the Partial Sum Multi-mode accumulate Adder (PSMA) of FIG. 13.

Figure 22:
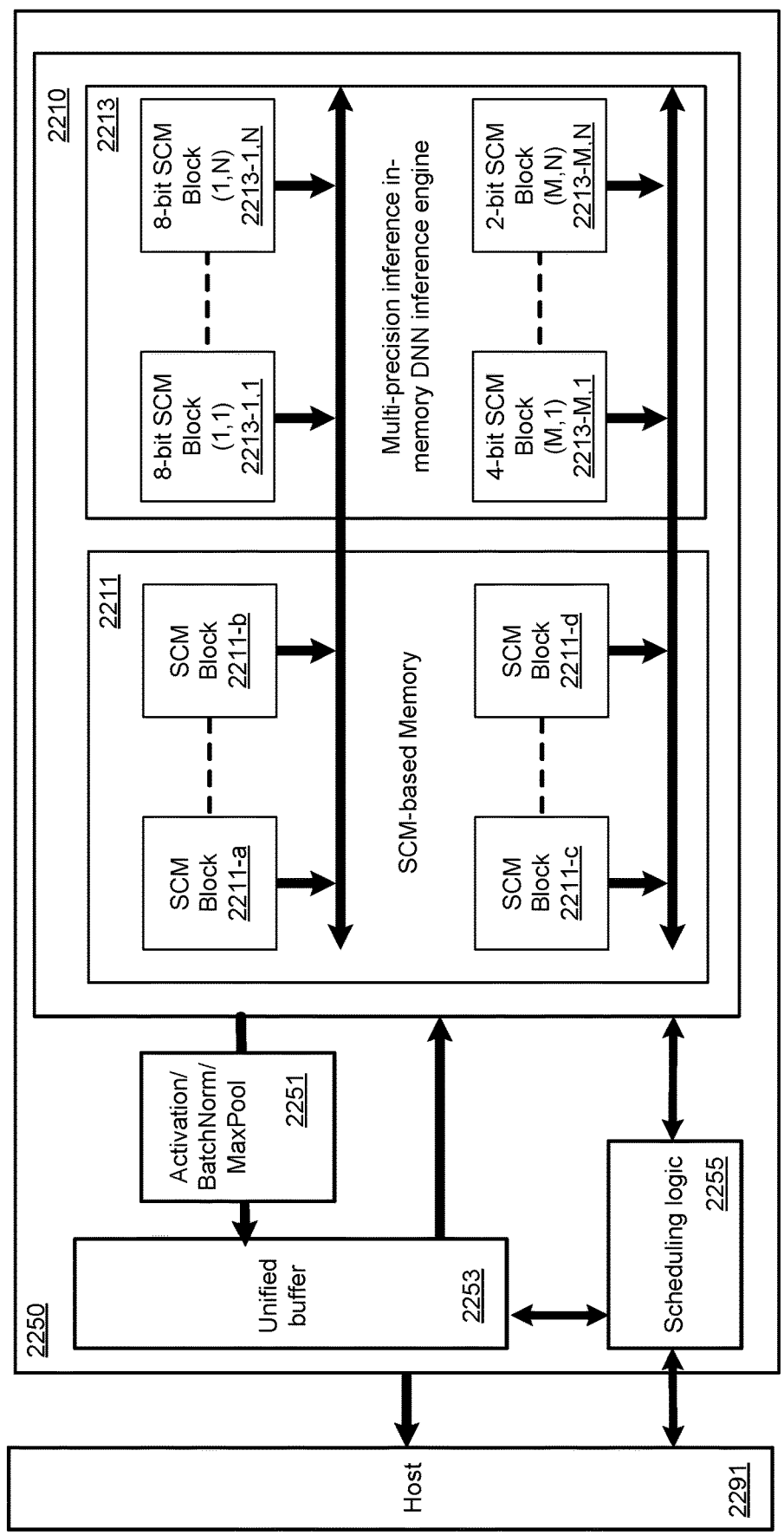

FIG. 22 is a block diagram of a high-level architecture for a multi-precision compute in memory DNN.

Figure 23:
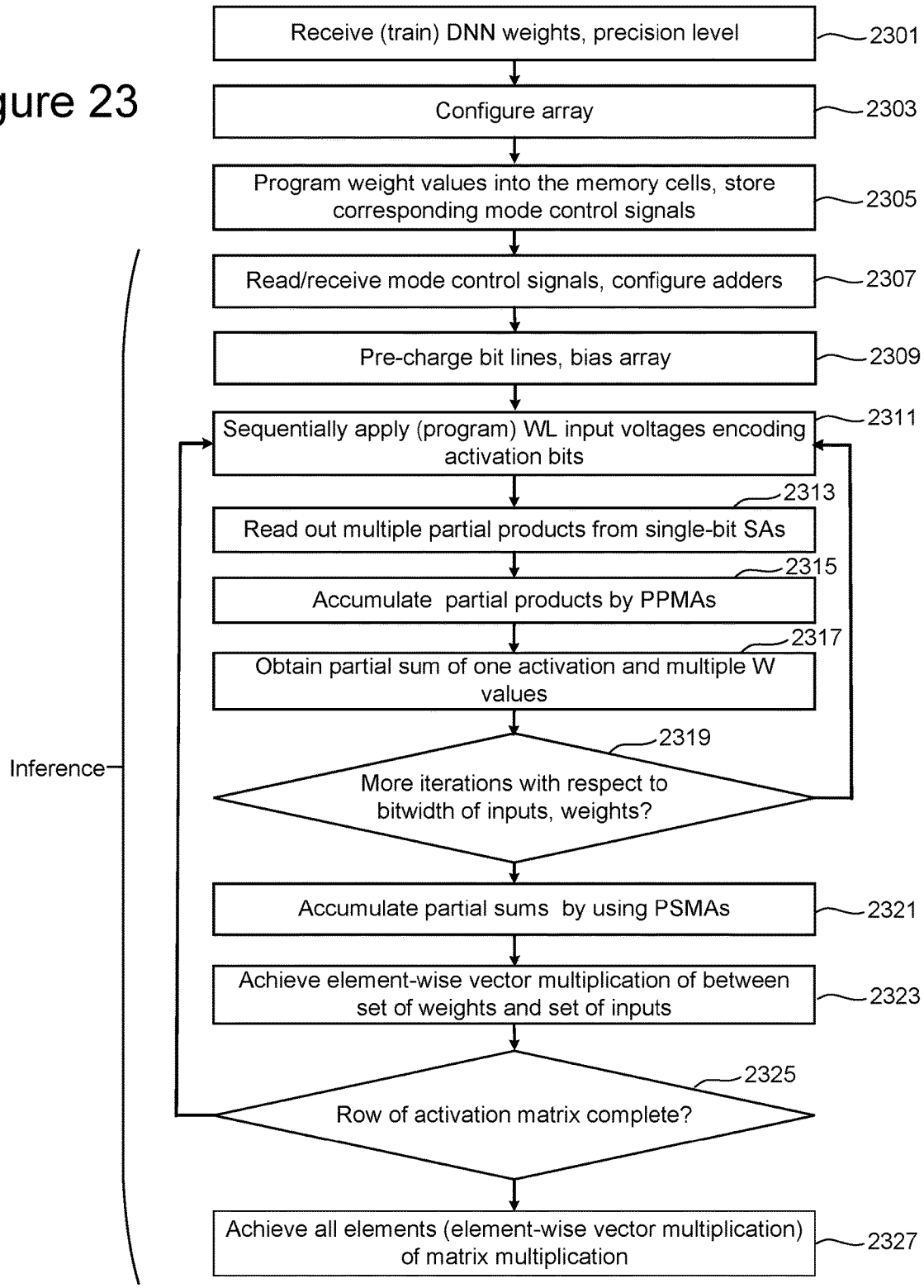

FIG. 23 is a flowchart for one embodiment for operation of a multi-precision compute in memory DNN inference engine to perform element-wise vector multiplication based on the structures of FIGS. 12-22.

DETAILED DESCRIPTION

When a neural network performs an inference or training operation, large numbers of computations each involving large amounts of data are performed, particularly in the case of Deep Neural Networks, or DNNs, that involve large numbers of layers through which the inputs must be propagated. To avoid the movement of large amounts of data in and out of the memory device, the weights of the layers for a neural network are stored in the non-volatile memory arrays of the memory device and the computations for each of the layers are performed on the device. When the weights and inputs (or activations) for the layers of an DNN are multi-bit values, there is a trade-off between accuracy and performance based on the number of bits that are used. The following presents embodiments for non-volatile memory devices that are configurable to store weights for layers of a DNN, and perform in-memory inferencing for the DNN, with differing levels for precision. For example, the same memory array can be configured to use activations and weights of 2-bit precision, 4-bit precision, or 8-bit precision.

For the embodiments described below, the in-array multiplication is performed between multi-bit valued inputs, or activations, for a layer of the DNN and multi-bit valued weights of the layer. Each bit of a weight value is stored in a binary valued memory cell of the memory array and each bit of the input is applied as a binary input to a word line of the array for the multiplication of the input with the weight. To perform a multiply and accumulate operation, the results of the multiplications are accumulated by adders connected to sense amplifiers along the bit lines of the array. The adders can be configured to multiple levels of precision, so that the same structure can accommodate weights and activations of 8-bit, 4-bit, and 2-bit precision.

Figure 1:
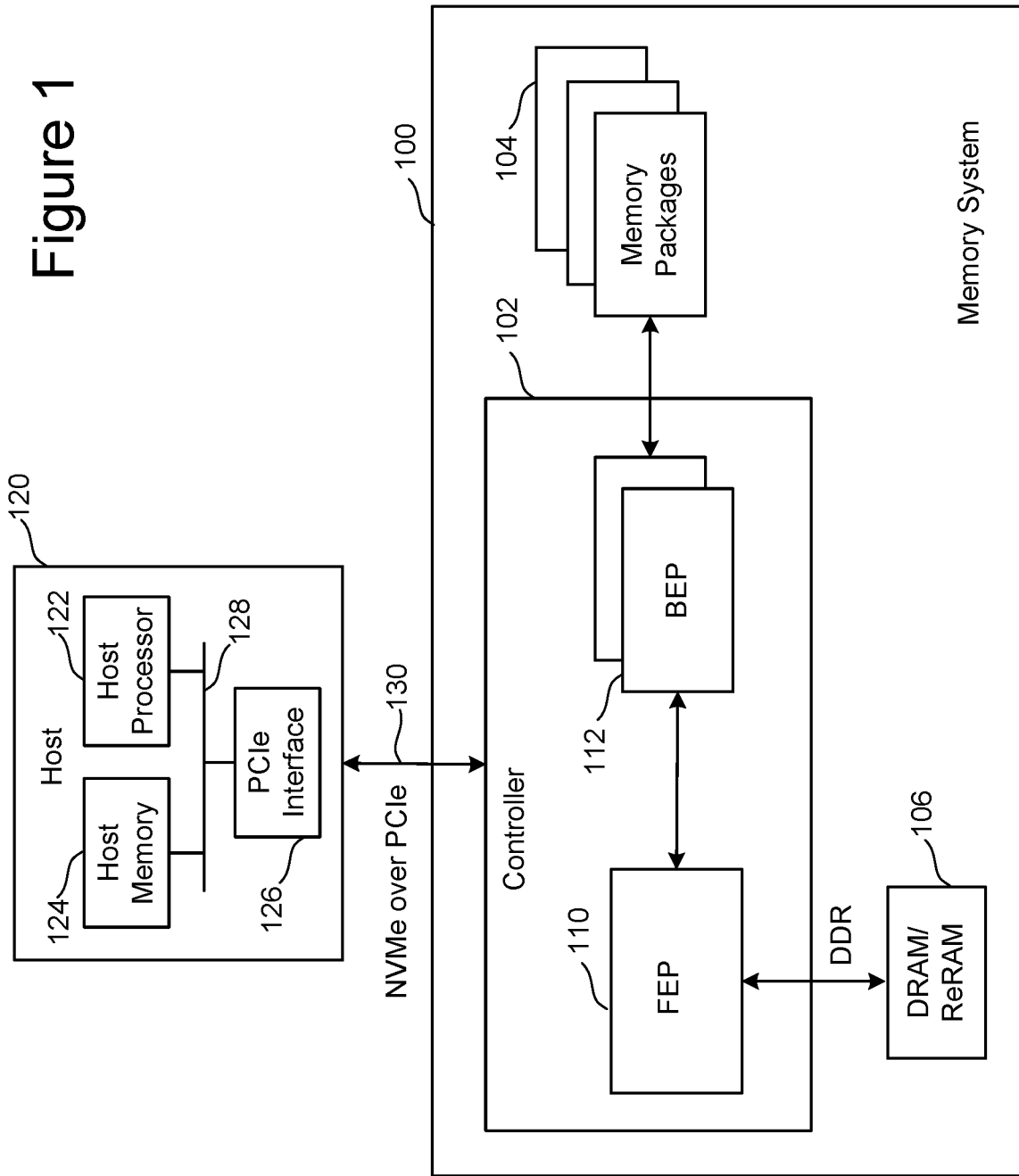
FIG. 1 is a block diagram of one embodiment of a memory system connected to a host.

FIG. 1 is a block diagram of one embodiment of a memory system 100 connected to a host 120. Memory system 100 can implement the technology proposed herein, where the neural network inputs or other data are received from the host 120. Depending on the embodiment, the inputs can be received from the host 120 and then provided to the memory packages 104 for inferencing on the weights previously programmed into the memory arrays of the memory packages 104. Many different types of memory systems can be used with the technology proposed herein. Example memory systems include solid state drives ("SSDs"), memory cards and embedded memory devices; however, other types of memory systems can also be used.

Memory system 100 of FIG. 1 comprises a controller 102, non-volatile memory 104 for storing data, and local memory (e.g. DRAM/ReRAM) 106. Controller 102 comprises a Front End Processor (FEP) circuit 110 and one or more Back End Processor (BEP) circuits 112. In one embodiment FEP circuit 110 is implemented on an ASIC. In one embodiment, each BEP circuit 112 is implemented on a separate ASIC. In other embodiments, a unified controller ASIC can combine both the front end and back end functions. The ASICs for each of the BEP circuits 112 and the FEP circuit 110 are implemented on the same semiconductor such that the controller 102 is manufactured as a System on a Chip ("SoC"). FEP circuit 110 and BEP circuit 112 both include their own processors. In one embodiment, FEP circuit 110 and BEP circuit 112 work as a master slave configuration where the FEP circuit 110 is the master and each BEP circuit 112 is a slave. For example, FEP circuit 110 implements a Flash Translation Layer (FTL) or Media Management Layer (MML) that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages.

In one embodiment, non-volatile memory 104 comprises a plurality of memory packages. Each memory package includes one or more memory die. Therefore, controller 102 is connected to one or more non-volatile memory die. In one embodiment, each memory die in the memory packages 104 utilize NAND flash memory (including two dimensional NAND flash memory and/or three dimensional NAND flash memory). In other embodiments, the memory package can include other types of memory, such as storage class memory (SCM) based on resistive random access memory (such as ReRAM, MRAM, FeRAM or RRAM) or a phase change memory (PCM).

Controller 102 communicates with host 120 via an interface 130 that implements NVM Express (NVMe) over PCI Express (PCIe). For working with memory system 100, host 120 includes a host processor 122, host memory 124, and a PCIe interface 126 connected along bus 128. Host memory 124 is the host's physical memory, and can be DRAM, SRAM, non-volatile memory or another type of storage. Host 120 is external to and separate from memory system 100. In one embodiment, memory system 100 is embedded in host 120.

Figure 2:
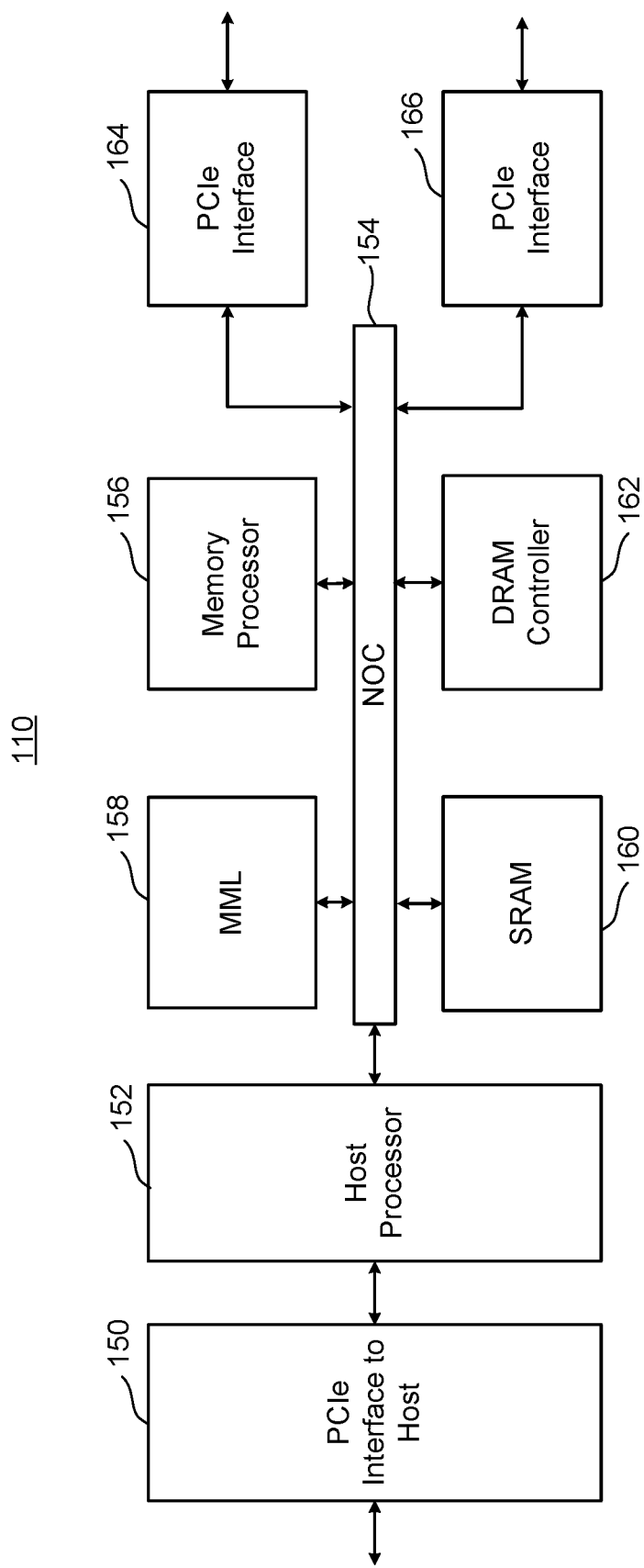
FIG. 2 is a block diagram of one embodiment of a Front End Processor Circuit.

FIG. 2 is a block diagram of one embodiment of FEP circuit 110. FIG. 2 shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOCs can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also, in communication with the NOC are two PCIe Interfaces 164 and 166. In the embodiment of FIG. 2, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

FEP circuit 110 can also include a Flash Translation Layer (FTL) or, more generally, a Media Management Layer (MML) 158 that performs memory management (e.g., garbage collection, wear leveling, load balancing, etc.), logical to physical address translation, communication with the host, management of DRAM (local volatile memory) and management of the overall operation of the SSD or other non-volatile storage system. The media management layer MML 158 may be integrated as part of the memory management that may handle memory errors and interfacing with the host. In particular, MML may be a module in the FEP circuit 110 and may be responsible for the internals of memory management. In particular, the MML 158 may include an algorithm in the memory device firmware which translates writes from the host into writes to the memory structure (e.g., 326 of FIG. 5 below) of a die. The MML 158 may be needed because: 1) the memory may have limited endurance; 2) the memory structure may only be written in multiples of pages; and/or 3) the memory structure may not be written unless it is erased as a block. The MML 158 understands these potential limitations of the memory structure which may not be visible to the host. Accordingly, the MML 158 attempts to translate the writes from host into writes into the memory structure.

FIG. 3 is a block diagram of one embodiment of the BEP circuit 112. FIG. 3 shows a PCIe Interface 200 for communicating with the FEP circuit 110 (e.g., communicating with one of PCIe Interfaces 164 and 166 of FIG. 2). PCIe Interface 200 is in communication with two NOCs 202 and 204. In one embodiment the two NOCs can be combined into one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. Data path controller 222 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

FIG. 4 is a block diagram of one embodiment of a memory package 104 that includes a plurality of memory die 292 connected to a memory bus (data lines and chip enable lines) 294. The memory bus 294 connects to a Toggle Mode Interface 296 for communicating with the TM Interface of a BEP circuit 112 (see e.g., FIG. 3). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

FIG. 5 is a functional block diagram of one embodiment of a memory die 300. The components depicted in FIG. 5 are electrical circuits. In one embodiment, each memory die 300 includes a memory structure 326, control circuitry 310, and read/write circuits 328. Memory structure 326 is addressable by word lines via a row decoder 324 and by bit lines via a column decoder 332. The read/write circuits 328 include multiple sense blocks 350 including SB1, SB2, . . . , SBp (sensing circuitry) and allow a page of memory cells to be read or programmed in parallel. Commands and data are transferred between the controller and the memory die 300 via lines 318. In one embodiment, memory die 300 includes a set of input and/or output (I/O) pins that connect to lines 318.

Control circuitry 310 cooperates with the read/write circuits 328 to perform memory operations (e.g., write, read, and others) on memory structure 326, and includes a state machine 312, an on-chip address decoder 314, and a power control circuit 316. State machine 312 provides die-level control of memory operations. In one embodiment, state machine 312 is programmable by software. In other embodiments, state machine 312 does not use software and is completely implemented in hardware (e.g., electrical circuits). In another embodiment, state machine 312 is replaced by a micro-controller. In one embodiment, control circuitry 310 includes buffers such as registers, ROM fuses and other storage devices for storing default values such as base voltages and other parameters. In particular, a set of mode registers 313 are explicitly shown, where these mode registers can be used to store values specifying the precision (i.e., number of bits) with which weights of a neural network are stored in portions of the memory structure 326.

The on-chip address decoder 314 provides an address interface between addresses used by controller 102 to the hardware address used by the decoders 324 and 332. Power control module 316 controls the power and voltages supplied to the word lines and bit lines during memory operations. Power control module 316 may include charge pumps for creating voltages. The sense blocks include bit line drivers.

For purposes of this document, the phrase "one or more control circuits" can include a controller, a state machine, a micro-controller and/or control circuitry 310, or other analogous circuits that are used to control non-volatile memory.

In one embodiment, memory structure 326 comprises a three dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping material such as described, for example, in U.S. Pat. No. 9,721,662, incorporated herein by reference in its entirety.

In another embodiment, memory structure 326 comprises a two dimensional memory array of non-volatile memory cells. In one example, the non-volatile memory cells are NAND flash memory cells utilizing floating gates such as described, for example, in U.S. Pat. No. 9,082,502, incorporated herein by reference in its entirety. Other types of memory cells (e.g., NOR-type flash memory) can also be used.

The exact type of memory array architecture or memory cell included in memory structure 326 is not limited to the examples above. Many different types of memory array architectures or memory technologies can be used to form memory structure 326. No particular non-volatile memory technology is required for purposes of the new claimed embodiments proposed herein. Other examples of suitable technologies for memory cells of the memory structure 326 include resistive random access memory (ReRAM), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 326 include two dimensional arrays, three dimensional arrays, cross-point arrays, stacked two dimensional arrays, vertical bit line arrays, and the like.

One example of a ReRAM cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 5 can be grouped into two parts, the memory structure 326 of the memory cells and the peripheral circuitry, including all of the other elements. An important characteristic of a memory circuit is its capacity, which can be increased by increasing the area of the memory die 300 that is given over to the memory structure 326; however, this reduces the area of the memory die 300 available for the peripheral circuitry. This can place quite serve restrictions on these peripheral elements. For example, the need to fit sense amplifier circuits within the available area can be a significant restriction on sense amplifier design architectures. With respect to the on-die control circuitry 310, reduced availability of area can limit the available functionalities that can be implemented on-chip. Consequently, a basic trade-off in the design of a memory die 300 is amount of area to devote to the memory structure 326 and the amount of area to devote to the peripheral circuitry.

Another area in which the memory structure 326 and the peripheral circuitry are often at odds is in the processing involved in forming these regions, since these regions often involve differing processing technologies and the trade-off in having differing technologies on a single die. For example, when the memory structure 326 is NAND flash, this is an NMOS structure, while the peripheral circuitry is often CMOS based. For example, sense amplifier circuits in the sense blocks 350, charge pumps in the power control block 316, logic elements in the state machine 312, and other peripheral circuitry often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 5 onto separately formed dies that are then bonded together. More specifically, the memory structure 326 can be formed on one die and some or all of the peripheral circuitry elements, including one or more control circuits, can be formed on a separate die. For example, a memory die can be formed of just the memory elements, such as the array of memory cells of flash NAND memory, a PCM memory, a ReRAM memory, or other memory type. Some or all of the peripheral circuitry, even including elements such as decoders and sense amplifiers, can then be moved on to a separate die. This allows each of the memory die to be optimized individually according to its technology. For example, a NAND memory die can be optimized for an NMOS based memory array structure, without worrying about the CMOS elements that have now been moved onto a separate peripheral circuitry die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other memory circuit. Although the following will focus on a bonded memory circuit of one memory die and one peripheral circuitry die, other embodiments can use more die, such as two memory die and one peripheral circuitry die, for example.

FIGS. 6A and 6B show an alternative arrangement to that of FIG. 5, which may be implemented using wafer-to-wafer bonding to provide a bonded die pair 604. FIG. 6A shows an example of the peripheral circuitry, including control circuits, formed in a peripheral circuit or control die 608 coupled to memory structure 326 formed in memory die 610. Common components are numbered as in FIG. 5. It can be seen that control circuitry 310, read/write circuits 328, and row decoder 324 (which may be formed by a CMOS process) are located in control die 608 Additional elements, such as functionalities from controller 102 can also be moved into the control die 608. Control circuitry 310, read/write circuits 328, row decoder 324, and column decoder 332 may be formed by a common process (e.g. CMOS process), so that adding elements and functionalities more typically found on a memory controller 102 may require few or no additional process steps (i.e. the same process steps used to fabricate controller 102 may also be used to fabricate control circuitry 310, read/write circuits 328, and row decoder 324). Thus, while moving such circuits from a die such as memory die 300 may reduce the number of steps needed to fabricate such a die, adding such circuits to a die such as control die 608 may not require any additional process steps.

FIG. 6A shows read/write circuits 328 on the control die 608 coupled to memory structure 326 on the memory die 610 through electrical paths 612. For example, electrical paths 612 may provide electrical connection between read/write circuits 328 and bit lines of memory structure 326. Electrical paths may extend from read/write circuits 328 in control die 608 through pads on control die 608 that are bonded to corresponding pads of the memory die 610, which are connected to bit lines of memory structure 326. Each bit line of memory structure 326 may have a corresponding electrical path in electrical paths 612, including a pair of bonded pads, that connects to read/write circuits 328. Similarly, row decoder circuits 324 are coupled to memory structure 326 through electrical paths 614. Each of electrical path 614 may correspond to a word line, dummy word line, or select gate line. Additional electrical paths may also be provided between control die 608 and memory die 610.

FIG. 6B is a block diagram showing more detail on the arrangement of one embodiment of the integrated memory assembly of bonded die pair 604. Memory die 610 contains a plane 620 or array of memory cells. The memory die 610 may have additional planes or arrays. One representative bit line (BL) and representative word line (WL) is depicted for each plane or array 620. There may be thousands or tens of thousands of such bit lines per each plane or array 620. In one embodiment, an array or plane represents a groups of connected memory cells that share a common set of unbroken word lines and unbroken bit lines.

Control die 608 includes a number of sense amplifiers (SA) 350. Each sense amplifier 350 is connected to one bit line or may be connected to multiple bit lines in some embodiments. The sense amplifier contains a bit line driver. Thus, the sense amplifier may provide a voltage to the bit line to which it is connected. The sense amplifier is configured to sense a condition of the bit line. In one embodiment, the sense amplifier is configured to sense a current that flows in the bit line. In one embodiment, the sense amplifier is configured to sense a voltage on the bit line.

The control die 608 includes a number of word line drivers 660(1)-660(n). The word line drivers 660 are configured to provide voltages to word lines. In this example, there are "n" word lines per array or plane memory cells. If the memory operation is a program or read, one word line within the selected block is selected for the memory operation, in one embodiment. If the memory operation is an erase, all of the word lines within the selected block are selected for the erase, in one embodiment. The word line drivers 660 (e.g. part of Power Control 316) provide voltages to the word lines in memory die 610. As discussed above with respect to FIG. 6A, the control die 608 may also include charge pumps, voltage generators, and the like that are not represented in FIG. 6B, which may be used to provide voltages for the word line drivers 660 and/or the bit line drivers.

The memory die 610 has a number of bond pads 670a, 670b on a first major surface 682 of memory die 610. There may be "n" bond pads 670a, to receive voltages from a corresponding "n" word line drivers 660(1)-660(n). There may be one bond pad 670b for each bit line associated with plane 620. The reference numeral 670 will be used to refer in general to bond pads on major surface 682.

In some embodiments, each data bit and each parity bit of a codeword are transferred through a different bond pad pair 670b, 674b. The bits of the codeword may be transferred in parallel over the bond pad pairs 670b, 674b. This provides for a very efficient data transfer relative to, for example, transferring data between the memory controller 102 and the integrated memory assembly 604. For example, the data bus between the memory controller 102 and the integrated memory assembly 604 may, for example, provide for eight, sixteen, or perhaps 32 bits to be transferred in parallel. However, the data bus between the memory controller 102 and the integrated memory assembly 604 is not limited to these examples.

The control die 608 has a number of bond pads 674a, 674b on a first major surface 684 of control die 608. There may be "n" bond pads 674a, to deliver voltages from a corresponding "n" word line drivers 660(1)-660(n) to memory die 610. There may be one bond pad 674b for each bit line associated with plane 620. The reference numeral 674 will be used to refer in general to bond pads on major surface 682. Note that there may be bond pad pairs 670a/674a and bond pad pairs 670b/674b. In some embodiments, bond pads 670 and/or 674 are flip-chip bond pads.

In one embodiment, the pattern of bond pads 670 matches the pattern of bond pads 674. Bond pads 670 are bonded (e.g., flip chip bonded) to bond pads 674. Thus, the bond pads 670, 674 electrically and physically couple the memory die 610 to the control die 608.

Also, the bond pads 670, 674 permit internal signal transfer between the memory die 610 and the control die 608. Thus, the memory die 610 and the control die 608 are bonded together with bond pads. Although FIG. 5A depicts one control die 608 bonded to one memory die 610, in another embodiment one control die 608 is bonded to multiple memory dies 610.

As used herein, "internal signal transfer" means signal transfer between the control die 608 and the memory die 610. The internal signal transfer permits the circuitry on the control die 608 to control memory operations in the memory die 610. Therefore, the bond pads 670, 674 may be used for memory operation signal transfer. Herein, "memory operation signal transfer" refers to any signals that pertain to a memory operation in a memory die 610. A memory operation signal transfer could include, but is not limited to, providing a voltage, providing a current, receiving a voltage, receiving a current, sensing a voltage, and/or sensing a current.

The bond pads 670, 674 may be formed for example of copper, aluminum and alloys thereof. There may be a liner between the bond pads 670, 674 and the major surfaces (682, 684). The liner may be formed for example of a titanium/titanium nitride stack. The bond pads 670, 674 and liner may be applied by vapor deposition and/or plating techniques. The bond pads and liners together may have a thickness of 720 nm, though this thickness may be larger or smaller in further embodiments.

Metal interconnects and/or vias may be used to electrically connect various elements in the dies to the bond pads 670, 674. Several conductive pathways, which may be implemented with metal interconnects and/or vias are depicted. For example, a sense amplifier 350 may be electrically connected to bond pad 674b by pathway 664. Relative to FIG. 6A, the electrical paths 612 can correspond to pathway 664, bond pads 674b, and bond pads 670b. There may be thousands of such sense amplifiers, pathways, and bond pads. Note that the BL does not necessarily make direct connection to bond pad 670b. The word line drivers 660 may be electrically connected to bond pads 674a by pathways 662. Relative to FIG. 6A, the electrical paths 614 can correspond to the pathway 662, the bond pads 674a, and bond pads 670a. Note that pathways 662 may comprise a separate conductive pathway for each word line driver 660(1)-660(n). Likewise, a there may be a separate bond pad 674a for each word line driver 660(1)-660(n). The word lines in block 2 of the memory die 610 may be electrically connected to bond pads 670a by pathways 664. In FIG. 6B, there are "n" pathways 664, for a corresponding "n" word lines in a block. There may be separate pair of bond pads 670a, 674a for each pathway 664.

Relative to FIG. 5, the on-die control circuits of FIG. 6A can also include addition functionalities within its logic elements, both more general capabilities than are typically found in the memory controller 102 and some CPU capabilities, but also application specific features. For example, these activation functions can include addition and threshold determination operations used in the accumulation portion of Multiple and ACcumulation (MAC) operations, but more advanced operations such as sigmoid or tanh functions.

In the following, state machine 312 and/or controller 102 (or equivalently functioned circuits), in combination with all or a subset of the other circuits depicted on the control die 608 in FIG. 6A and similar elements in FIG. 5, can be considered part of the one or more control circuits that perform the functions described herein. For the neural network operations described below, these elements can operate in conjunction with the processor 892 and other elements of the read/write circuits 328 described in FIGS. 5 and 6A. The control circuits can include hardware only or a combination of hardware and software (including firmware). For example, a controller programmed by firmware to perform the functions described herein is one example of a control circuit. A control circuit can include a processor, FGA, ASIC, integrated circuit or other type of circuit.

Turning now to types of data that can be stored on non-volatile memory devices, a particular example of the type of data of interest in the following discussion is the weights used is in artificial neural networks, such as convolutional neural networks or CNNs. The name "convolutional neural network" indicates that the network employs a mathematical operation called convolution, that is a specialized kind of linear operation. Convolutional networks are neural networks that use convolution in place of general matrix multiplication in at least one of their layers. A CNN is formed of an input and an output layer, with a number of intermediate hidden layers. The hidden layers of a CNN are typically a series of convolutional layers that "convolve" with a multiplication or other dot product.

Each neuron in a neural network computes an output value by applying a specific function to the input values coming from the receptive field in the previous layer. The function that is applied to the input values is determined by a vector of weights and a bias. Learning, in a neural network, progresses by making iterative adjustments to these biases and weights. The vector of weights and the bias are called filters and represent particular features of the input (e.g., a particular shape). A distinguishing feature of CNNs is that many neurons can share the same filter.

FIG. 7 is a schematic representation of an example of a CNN. FIG. 7 illustrates an initial input image of an array of pixel values, followed by a number convolutional layers that are in turn followed by a number of fully connected layers, the last of which provides the output. Each neuron in the first convolutional layer (Con 1) takes as input data from an n×n pixel sub-region of the input image. The neuron's learned weights, which are collectively referred to as its convolution filter, determine the neuron's single-valued output in response to the input. In the convolutional layers, a neuron's filter is applied to the input image by sliding the input region along the image's x and y dimensions to generate the values of the convolutional layer. In practice, the equivalent convolution is normally implemented by statically identical copies of the neuron to different input regions. The process is repeated through each of the convolutional layers (Coni to Con N) using each layer's learned weights, after which it is propagated through the fully connected layers (L1 to LM) using their learned weights.

FIG. 8 represents several fully connected layers of a neural network in more detail. In FIG. 8, the shown three layers of the artificial neural network are represented as an interconnected group of nodes or artificial neurons, represented by the circles, and a set of connections from the output of one artificial neuron to the input of another. The example shows three input nodes ($I_1$, $I_2$, $I_3$) and two output nodes ($O_1$, $O_2$), with an intermediate layer of four hidden or intermediate nodes ($H_1$, $H_2$, $H_3$, $H_4$). The nodes, or artificial neurons/synapses, of the artificial neural network are implemented by logic elements of a host or other processing system as a mathematical function that receives one or more inputs and sums them to produce an output. Usually each input is separately weighted and the sum is passed through the node's mathematical function to provide the node's output.

In common artificial neural network implementations, the signal at a connection between nodes (artificial neurons/synapses) is a real number, and the output of each artificial neuron is computed by some non-linear function of the sum of its inputs. Nodes and their connections typically have a weight that adjusts as a learning process proceeds. The weight increases or decreases the strength of the signal at a connection. Nodes may have a threshold such that the signal is only sent if the aggregate signal crosses that threshold. Typically, the nodes are aggregated into layers. Different layers may perform different kinds of transformations on their inputs. Signals travel from the first layer (the input layer), to the last layer (the output layer), possibly after traversing the layers multiple times. Although FIG. 7 shows only a single intermediate or hidden layer, a complex deep neural network (DNN) can have many such intermediate layers.

A supervised artificial neural network is "trained" by supplying inputs and then checking and correcting the outputs. For example, a neural network that is trained to recognize dog breeds will process a set of images and calculate the probability that the dog in an image is a certain breed. A user can review the results and select which probabilities the network should display (above a certain threshold, etc.) and return the proposed label. Each mathematical manipulation as such is considered a layer, and complex neural networks have many layers. Due to the depth provided by a large number of intermediate or hidden layers, neural networks can model complex non-linear relationships as they are trained.

FIG. 9A is a flowchart describing one embodiment of a process for training a neural network to generate a set of weights. The training process is often performed in the cloud, allowing additional or more powerful processing to be accessed. At step 901, the input, such as a set of images, is received (e.g., the image input in FIG. 7). At step 903 the input is propagated through the layers connecting the input to the next layer (e.g., CON1 in FIG. 7) using the current filter, or set of weights. The neural network's output is then received at next layer (e.g., CON2 in in FIG. 7) in step 905, so that the values received as output from one layer serve as the input to the next layer. The inputs from the first layer are propagated in this way through all of the intermediate or hidden layers until they reach the output. In the dog breed example of the preceding paragraph, the input would be the image data of a number of dogs, and the intermediate layers use the current weight values to calculate the probability that the dog in an image is a certain breed, with the proposed dog breed label returned at step 905. A user can then review the results at step 907 to select which probabilities the neural network should return and decide whether the current set of weights supply a sufficiently accurate labelling and, if so, the training is complete (step 911). If the result is not sufficiently accurate, the neural network adjusts the weights at step 909 based on the probabilities the user selected, followed by looping back to step 903 to run the input data again with the adjusted weights. Once the neural network's set of weights have been determined, they can be used to "inference," which is the process of using the determined weights to generate an output result from data input into the neural network. Once the weights are determined at step 911, they can then be stored in non-volatile memory for later use, where the storage of these weights in non-volatile memory is discussed in further detail below.

FIG. 9B is a flowchart describing a process for the inference phase of supervised learning using a neural network to predict the "meaning" of the input data using an estimated accuracy. Depending on the case, the neural network may be inferenced both in the cloud and by an edge device's (e.g., smart phone, automobile process, hardware accelerator) processor. At step 921, the input is received, such as the image of a dog in the example used above. If the previously determined weights are not present in the device running the neural network application, they are loaded at step 922. For example, on a host processor executing the neural network, the weight could be read out of an SSD in which they are stored and loaded into RAM on the host device. At step 923, the input data is then propagated through the neural network's layers. Step 923 will be similar to step 903 of FIG. 9B, but now using the weights established at the end of the training process at step 911. After propagating the input through the intermediate layers, the output is then provided at step 925.

FIG. 10 is a schematic representation of a convolution operation between an input image and filter, or set of weights. In this example, the input image is a 6×6 array of pixel values and the filter is a 3×3 array of weights. The convolution operation is performed by a matrix multiplication the 3×3 filter with 3×3 blocks of the input image. For example, the multiplication of the upper-left most 3×3 block of the image with the filter results in the top left value of the output matrix. The filter can then be slid across by one pixel on the image to generate the next entry of the output, and so on to generate a top row of 4 elements for the output. By repeating this by sliding the filter down a pixel at a time, the 4×4 output matrix is generated. Similar operations are performed for each of the layers. In a real CNN, the size of the data sets and the number of convolutions performed mean that extremely large numbers of such operations are performed involving very large amounts of data.

FIG. 11 is a schematic representation of the use of matrix multiplication in a fully connected layer of a neural network. Matrix multiplication, or MatMul, is a commonly used approach in both the training and inference phases for neural networks and is used in kernel methods for machine learning. FIG. 11 at top is similar to FIG. 8, where only a single hidden layer is shown between the input layer and the output layer. The input data is represented as a vector of a length corresponding to the number of input nodes. The weights are represented in a weight matrix, where the number of columns corresponds to the number of the number of intermediate nodes in the hidden layer and the number of rows corresponds to the number of input nodes. The output is determined by a matrix multiplication of the input vector and the weight matrix, where each element of the output vector is a dot product of the vector of the input data with a column of the weight matrix.

A common technique for executing the matrix multiplications is by use of a multiplier-accumulator (MAC, or MAC unit). However, this has a number of issues. Referring back to FIG. 9B, the inference phase loads the neural network weights at step 922 before the matrix multiplications are performed by the propagation at step 923. However, as the amount of data involved can be extremely large, use of a multiplier-accumulator for inferencing has several issues related to the loading of weights. One of these is high energy dissipation due to having to use large MAC arrays with the required bit-width. Another is high energy dissipation due to the limited size of MAC arrays, resulting in high data movement between logic and memory and an energy dissipation that can be much higher than used in the logic computations themselves.

To help avoid these limitations, the use of a multiplier-accumulator array can be replaced with other memory technologies. For example, the matrix multiplication can be computed within a memory array by leveraging the characteristics of NAND memory and Storage Class Memory (SCM), such as those based on ReRAM, PCM, FeRAM or MRAM based memory cells. This allows for the neural network inputs to be provided via read commands and the neural weights to be preloaded for inferencing. By use of in-memory computing, this can remove the need for logic to perform the matrix multiplication in the MAC array and the need to move data between the memory and the MAC array.

The following presents embodiments of a digital multi-precision Compute-in-Memory Deep Neural Network (CIM-DNN) engine for flexible and energy-efficient inferencing. The described memory array architectures support multi-precisions for both activations (inputs to a network layer) and weights that can be run-time configurable on the demand of inference accuracy. This results in an inference engine architecture that supports mixed-precision computing, can provide a "near-digital" compute-in-memory array architecture without the need of multi-bit analog to digital converters (ADCs) and digital to analog converters (DACs), supports signed multiplication with simple digital logic, and realize AND logic operations in SCM or single level cell (SLC) Flash memory to reduce data movement costs. This arrangement supports variable throughput and energy efficiency with an inference accuracy trade-off. Examples of where this structure can used include the support of specific application domains which require inferencing data in on-demand modes (energy-efficiency or high accuracy) and as the forward path of "integer" quantization-aware training in order to achieve high-accuracy models when combining with hardware engines which support activation and gradient descent computation.

When performing an inference operation with a DNN, the amount of error varies with the precision of the activations and the weights. Quantizing activations and weights using a higher bit-width offers lower error for inference, but increases run-time and requires greater space for storing the weights in non-volatile memory. The embodiments presented here provide an architecture for compute-in-memory DNN inference engines that support multi-precision computing and that is run-time configurable based on accuracy requirements. Rather than supporting only a fixed bit-width for weights and activations, the memory architectures described in the following allow for a compute-in-memory DNN inference engine that balances programmability, performance, and compute efficiency.

Before discussing embodiments for architectures for multi-precision compute-in-memory DNN arrays, the next few paragraphs provide some background on bit-level matrix multiplication using partial sums and partial products. To simplify the discussion, the input (or activation), weight, and output matrices are taken to have the same size and bit-width, although the structured described below extend more general combinations of input, weight, and output sizes and bit-widths. The following uses the example of 4×4 matrix size and an 8-bit bit-width for the matrix entries of the input and weight values. The matrix multiplication of activation or input matrix I and the weight matrix W is:

$$[P]_{4\times 4}=[I]_{4\times 4}*[W]_{4\times 4}$$

The notation refers that these are 4×4 matrices and P is the element-wise vector multiplication. The components of $[P]_{4\times4}$ are given by:

$$P_{i,j} = \sum_{k=0}^{k=3} I_{i,k} W_{k,j}, \text{ where } i,j=0,\ldots,3 \quad (Eq.\ 1)$$

The expression $I_{i,k}W_{k,j}$ is Called the Partial Sum (PS).

For each of the components, the bit-level result of the element-wise multiplication is:

$$PP = I * W = (W^7 W^6 \ldots W^1 W^0) * (I^7 I^6 \ldots I^1 I^0) \quad (Eq.\ 2)$$
$$= \sum_{i=0}^{7} 2^i * \sum_{j=0}^{j=7} 2^j * PP^{i,j}$$

$PP^{i,j} = W^i * I^j$ is called a Partial Product (PP). A PP can be computed by use of AND logic, for example, if data is read out from memory. However, in the embodiments presented below, each PP can be computed in-memory by using a single binary value (or single level cell, SLC) NAND Flash memory cell or SCM memory cell without the need of reading out data, improving performance and energy efficiency of the inference engine. The element-wise unsigned multiplication of an 8-bit input (activation) and an 8-bit weight is illustrated schematically in FIG. 12.

FIG. 12 is a schematic representation of the unsigned multiplication of the bits of a component of the input (or activation) matrix and a component of the weight matrix. In the example, each of these are 8-bit values, where the top row of FIG. 12 are the input bits ($I^7$, $I^6$, ..., $I^0$) and the second row is the weight bits ($W^7$, $W^6$, ..., $W^0$). (Although FIG. 12 represents an unsigned multiplication, the embodiments presented here support both signed and unsigned computation.) Below this are the partial products, $PP^{i,j}$, arranged in columns based on their "order"=(i+j). The first column holds $PP^{7,7}$; followed by the column with $PP^{7,6}$ and $PP^{6,7}$; then the column with $PP^{7,5}$, $PP^{6,6}$, and $PP^{5,7}$; and so on. For example, as shown in the broken boxes, $PP^7$ is formed of $PP^{7,0}+PP^{6,1}+ \ldots +PP^{0,7}$. In FIG. 12, only the $PP^{7,j}$, $PP^{6,j}$, and $PP^{0,j}$ are shown, with the dotted line representing an ellipsis for the values not shown. When these elements are combined as in Equation 2 above, these the element-wise unsigned multiplication of an 8-bit activation and an 8-bit weight value to provide the 16-bit value $PP=(PP^{16}PP^{15} \ldots PP^1PP^0)$.

Embodiments of memory array architectures are now described that can be configured for compute in memory operations of a DNN with varying precision. More specifically, the examples described below support precision for both the activation and weight values of: 8-bit precision for high accuracy, but lower performance; 4-bit precision, for intermediate accuracy and performance; and 2-bit precision for lesser accuracy, but higher throughput. The weight values of the DNN's layers are stored on binary, or SLC, valued memory cells that can be NAND flash memory cells or SCM-based memory cells, depending on the embodiment, and used to perform AND operations for activation and weight bits.

Matrix multiplication is performed within the memory array by a sequence of reads. Multi-bit weight values can be pre-programmed in the memory cells of the array, with each bit stored in a memory cell so that, for example, an 8-bit weight values is stored in 8 memory cells along a word line, two 4-bit weight values are stored in two groups of 4 memory cells along a word line, and so on, allowing the weights to be packed for parallel computing. To perform the multiplication, multiple bit lines (eight bit lines in the examples here) are activated in parallel and the word lines are sequentially biased to be programmed by the input/activation bits. A sense amplifier can be associated with each of the bit lines to sense the bit line current to determine a digital value of either a 0 or a 1 bit value, so that the sense amplifiers can be implemented as relatively simple single-bit sense amplifier circuits.

To perform the addition and multiplication operations described above with respect to Equations 1 and 2 and FIG. 12, two levels of adders work in a pipelined arrangement to access the memory array and sense amplifiers for throughput improvement. In a first level, a Partial Product Multi-mode accumulate Adder (PPMA) generates partial sums by accumulating the partial products of corresponding activation and weight bits (bit-level accumulation). In a second level, a Partial Sum Multi-mode accumulated Adder (PSMA) generate final output (e.g., element-wise vector multiplication) by accumulating corresponding partial sums (value-level accumulation). FIG. 13 illustrate an embodiment for an architecture that targets supporting a common 2-/4-/8-bit precision for compute in memory DNN inference engines; however, this structure is extendable and not limited to supporting just these precision examples.

FIG. 13 illustrates an embodiment of a non-volatile memory array for multi-precision compute in memory operations for a DNN. The example in FIG. 13 is for determining the product of a 4×4 weight matrix $[W]_{4\times4}$ and a 4×4 activation or input matrix $[I]_{4\times4}$, where the product will also be a 4×4 matrix: $[P]_{4\times4}=[W]_{4\times4}*[I]_{4\times4}$. Each of the entries of weight and input matrices in this example can be 8-bit, 4-bit, or 2-bit and the entries of the product matrix can respectively be 16-bit, 8-bit, or 4-bit values. The weights are stored in the memory array, with each bit of each matrix element stored as a binary value in one of the memory cells. For a 4×4 matrix of 8-bit values, this corresponds to 4×4×8=128 memory cells. An array can have more, often very more, memory cells along additional word lines and bit lines that can store more weights of the neural network or other data, but these are not explicitly represented in FIG. 13. In other embodiments, the array size and structure can be specific to this particular neural network structure. In FIG. 13, the weights are stored along four word lines $WL^j$ 1311-j, j=0-3, and four memory array sub-divisions 1326-i, i=0-3. The weight values $W_{i,j}$ are stored in sub-array 1326-i along word line 1311-j.

Within each of the sub-arrays 1326-i, each of the different bit values of the weights are stored along different bit lines $BL^k$ 1313-k of the correspond array. For the embodiments in this example, where weight values are 8-bit at most, each memory array sub-division 1326-i has eight bit lines. As arranged in the example, the 8 bits of weight values $W_{0,j}^7$ to $W_{0,j}^0$, where the superscripts are the bit values from 7 (most significant) to 0 (least significant), are along bit lines $BL^0$ to $BL^7$; the 8 bits of weight values $W_{1,j}^7$ to $W_{1,j}^0$ are along bits $BL^8$ to $BL^{15}$; the 8 bits of weight values $W_{2,j}^7$ to $W_{2,j}^0$ are along bits $BL^{16}$ to $BL^{23}$; and the 8 bits of weight values $W_{3,j}^7$ to $W_{3,j}^0$ are along bits $BL^{24}$ to $BL^{31}$. When weight values of lower precision are used, the sub-divisions 1326-i can be further sub-divided. For example, if 4-bit precision is used for the weight values, two 4-bit weight values can be stored along each word line in a sub-division (e.g., one 4-bit weight matrix entry value along bit lines $BL^0$-$BL^3$ and another 4-bit weight matrix entry value along bit lines $BL^4$-$BL^7$); and if 2-bit precision is used for the weight values, four 2-bit weight values can be stored along each word line in a sub-division (e.g., one 2-bit weight matrix entry value along bit lines $BL^0$-$BL^1$, a second 2-bit weight matrix entry value along bit lines $BL^2$-$BL^3$, a third 2-bit weight matrix entry value along bit lines $BL^4$-$BL^5$, and a fourth 2-bit weight matrix entry value along bit lines $BL^6$-$BL^7$).

The input or activation matrix values are input as columns $I_{j,1}{}^k$ for column l that is applied along word line WL-j 1311-*j* for each bit value k. For the example here, j=0-3 and l=0-3 as the input matrix is a 4×4 matrix. With respect to the number of bits for the input or activation values, for 8-bit values k=0-7 and there are 4 input columns of along the 4 word lines as illustrated in FIG. 13. For other bit values, the sub-divisions 1326-*i* will be split as described above into, for example, two 4-bit segments or four 2-bit segments. Similarly, the input values can be, for example, 4-bit or 2-bit values that would corresponding split each of the shown 8-bit input columns into 2 or 4 sets of input columns. The voltages corresponding the binary input values can be applied by the row decoder circuits 324, including drivers within these circuits, of FIG. 5 or 6A as a corresponding voltage level, where the row decoders 324 can be taken as part of the control circuitry for performing memory operations. Under this arrangement, a DAC is not required for applying the inputs.

Each of the bit lines is connected to a bit amplifier SA 1350, where these can be single-bit sense amplifiers. In the example of FIG. 13 where the weight values can be up to 8-bits, each array sub-division 1326-*i* has a corresponding 8 sense amplifiers $SA^{i,7}$-$SA^{i,0}$ for the eight bit lines bit lines. The outputs of the 8 sense amplifiers $SA^{i,7}$-$SA^{i,0}$ for each division is the partial product $PP^7$-$PP^0$ for the sub-division 1326-*i*, which serves as input to the Partial Product Multi-mode accumulate Adder PPMA 1361-*i*. The output of each of the Partial Product Multi-mode accumulate Adders PPMA 1361-*i* will be the partial sums $PS_{i,j}$ for the input column j. To support different modes for different levels of precision (here 8-bit, 4-bit, or 2-bit), the Partial Product Multi-mode accumulate Adders PPMA 1361-*i* receive a mode select value M[2:0] signal and a left-shift per mode LSh signal from the control unit 1341, where the control unit 1341 can correspond to elements of the on-die control circuitry 310 of FIGS. 5 and 6A. The operation of the PPMAs 1361-*i* do not use an ADC and are described in more detail with respect to FIGS. 17-20.

The partial sums from the PPMA 1361-*i* are the input to the Partial Sum Multi-mode accumulate Adders PSMA 1363-*i* to generate the product outputs $P_{i,3}$-$P_{i,0}$ for the row i. The PSMA 1363-*i* also receive the mode select value M[2:0] signal, where the operation of the PSMA 1363-*i* are described in more detail with respect to FIG. 21. Taken together, the outputs for each of rows 0-3 provide the values of the (in this example) 4×4 product $[P]_{4\times4}=[I]_{4\times4}*[W]_{4\times4}$.

The compute-in-memory AND logic is performed in-array by storing the bits of the weights as binary values in the memory cells and applying the input or activation values as binary values along the word lines. FIG. 14-16 illustrate embodiments for the AND logic using SLC NAND flash memory cells and binary value SCM memory cells.

FIG. 14 is table illustrating the operation of an SLC NAND flash memory cell for implementing the AND logic for an in-array multiplication and FIG. 15 illustrates the relation of input voltage and threshold voltages for NAND memory cells. The table of FIG. 14 shows four cases for the four combinations of input logic values and weight logic values. The input logic values are implemented by the word line voltage levels ($V_{IN}$), where a "0" input logic corresponds to a pass voltage, $V_{PASS}$, that is a high voltage that will cause a NAND memory cell to conduct whether in an erased or a programmed state. A "1" input logic state corresponds to a low voltage (such as ground, or 0V) $V_{READ}$ that will allow a NAND memory cell to conduct in an erased low voltage threshold state, but not allow a memory cell in a programmed high threshold voltage state to conduct. (Please note that the correspondence of input logic values "0" and "1" to $V_{PASS}$ and $V_{READ}$, respectively, is reversed relative to a common labelling of these voltage levels.)

The weight logic levels are stored in the NAND memory cells based on the threshold voltage of the memory cell: a weight logic value of "0" is stored as a low threshold voltage, or erased, state for the memory cell; and a weight logic value of "1" is stored as a high threshold voltage, or programmed, state for the memory cell. (Note that this differs from a common convention in which "1" is used for the erase state, "0" for the programmed state.) The relationship between the threshold voltages, word line voltages, and the logic values is illustrated in FIG. 15.

FIG. 15 shows two distributions of memory cells of a memory array, where the distribution of erased memory cells having a threshold voltage $V_{th}$ below 0V corresponding to a weight logic value of "0". The distribution of programmed memory cells has a threshold voltage $V_{th}$ above 0V corresponding to a weight logic value of "1". The voltage $V_{PASS}$ corresponds to an input logic value of "0" and is above the $V_{th}$ for either weight logic state and will consequently turn on a memory cell in either weight logic state, causing the memory cell to conduct a discharge current of $I_{PASS}$ on the memory cell's bit line. For the lower $V_{READ}$ value of, for example, 0V on the word line corresponding to an input logic value of "1", this will still be above the $V_{th}$ for a weight logic of "0", so that the memory still will still conduct a discharge current of $I_{READ}$ on the memory cell's bit line. Typically, the $I_{READ}$ value will be somewhat less than the $I_{PASS}$ current, but will still be registered by the sense amplifiers as conducting. For the combination of case 4, when the input logic is "1" and weight logic is "1", the voltage $V_{READ}$ on the word line will be less than the memory cell's $V_{th}$ and the memory cell will not conduct, as represented by the X in the discharge current column in FIG. 14. If the single-bit sense amplifiers operate in an inverted mode, where a conducting memory cell registers as a "0" and a non-conducting memory registers as a "1", the SA output voltage will correspond to the expected AND output logic values of the last column of FIG. 14.

Although referred to here as a NAND memory embodiment, the embodiment may be based on any of a number of types of programmable threshold memory cells. For example, embodiments could be based on EEPROM memory cells without a NAND structure, such as in a NOR architecture. When implemented as a NAND memory, the voltage levels described with respect to FIGS. 14 and 15 would correspond to a selected memory cell within a NAND string, where the control circuits (such as the row decode circuits 324) would also drive the non-selected word lines and select gates to be biased in an ON state, such as by applying the $V_{PASS}$ voltage to these other elements of the NAND string.

FIG. 16 is table illustrating the operation of storage class memory (SCM) cell for implementing the AND logic in-array multiplication for a compute-in-memory DNN. Examples of SCM memory technologies are ReRAM, MRAM, FeRAM, RRAM or PCM. In such memory technologies, each of the memory cells is connected between a corresponding word line and a corresponding bit line, with data encoded as either a high resistance state or a low resistance state. The different cases in FIG. 16 are numbered the same as in FIG. 14. An input logic value of "0" corresponding to a word line voltage of $V_{IN}=0V$ (or, more generally, other low voltage level) and an input logic value of "1" a higher voltage level V. A weight logic value of "0" corresponds to a high resistance state (HRS) for the memory cell and a weight logic value of "1" corresponds to a low resistance state (LRS). For either of cases 1 or 2, the word line voltage is 0, so that little if any current will discharge and the only current will be a relatively small leakage current, $I_{LEAK}$. For case 3, when the word line voltage is V and the memory cell is in a high resistance state, the memory cell will have some current discharged through the cell onto the bit line, but of a small value (small $I_{CELL}$). For case 4, for the combination of a high word line voltage and low resistance state on the memory cell, the discharge current on the bit line will be a large value (large $I_{CELL}$). If the sense amplifiers work in an inverted mode, where a large $I_{CELL}$ corresponds a sense amplifier output logic of "1" and other values are sensed as "0", the sense amplifier voltage values correspond to the expected AND output.

FIGS. 17-20 illustrate an embodiment for the partial product multi-mode accumulate adder of FIG. 13 in more detail. The Partial Product Multi-mode accumulate Adder PPMA 1361 sums up partial products PP into a partial sumPS. The PPMA 1361 includes cascaded adders 1701 that receive the bits $PP^7$-$PP^0$ from the corresponding sense amplifiers. The cascaded adders 1701 also receive the mode-control signals $M^{2:0}$ from the one or more control circuits represented at control unit 1341. PPMA 1721 also includes a multi-mode left shifter 1721 that receives the mode-control signals $M^{2:0}$ and a left shift control signal LSh from the control unit 1341 and provides the additional input $S^{15:0}$ to the cascaded adders 1701. The cascade adders 1701, multi-mode left shifter 1721, and the mode-control signal $M^{2:0}$ are discussed in more detail with respect to FIGS. 18-20.

Based on the mode-control signal $M^{2:0}$, in the example embodiment of PPMA 1361 can operate in an 8-bit full precision mode with a 16-bit output for partial sums; in an 4-bit half precision mode with two 8-bit outputs for partial sums; and in an 2-bit full quarter precision mode with four 4-bit outputs for partial sums. Although the examples discussed here have weight values and input values with the same number of bits, the embodiment can also accommodate cases where these values differ, such as for 4-bit weights and 8-bit inputs. To facilitate operation for these options, the embodiment of FIG. 17 has four output registers for the bits of the partial sum: Reg 1711 for $PS^{15:12}$; Reg 1713 for $PS^{11:8}$; Reg 1715 for $PS^{7:4}$; and Reg 1717 for $PS^{3:0}$. The bit-width of the output of PPMA 1361 can be truncated at the truncation circuit 1723 to the 8-bit truncated value $TPS^{7:0}$ without hardware overhead before sending to the next stage (PSMA 1363).

Figure 18:
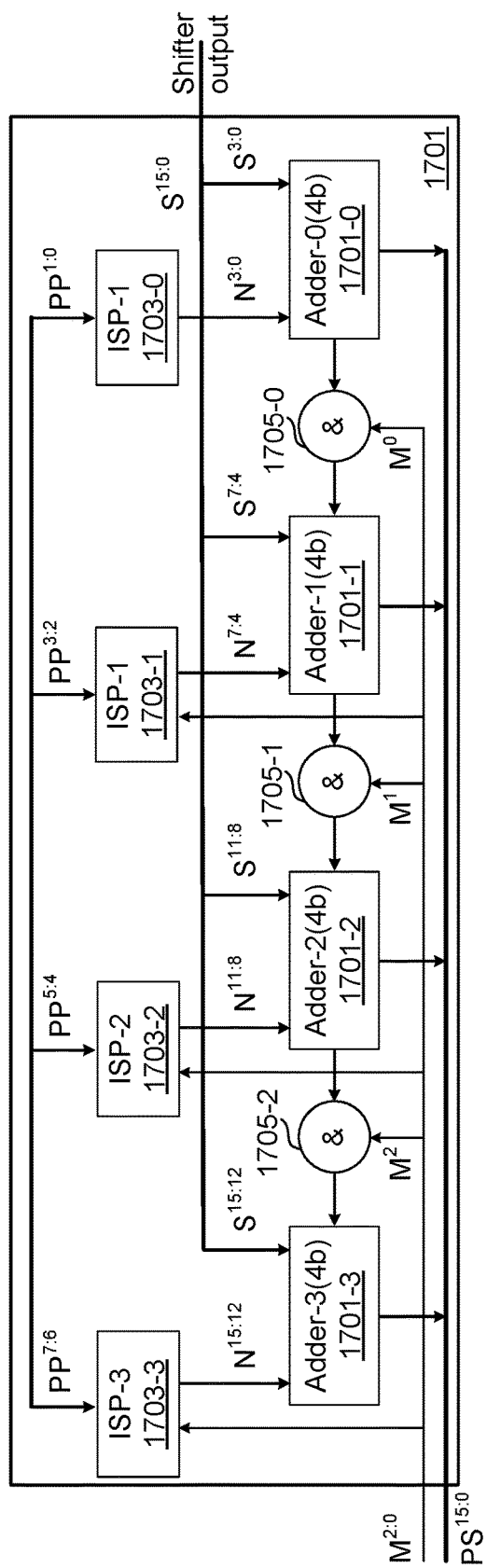

FIG. 18 show an embodiment for the cascaded adders 1701 in more detail. A set of four 4-bit adders, Adder-3 1701-3, Adder-2 1701-2, Adder-1 1701-1, and Adder-0 1701-0 can be operated as four 4-bit adders or connected into two 8-bit adders or one 16-bit adders based upon which of the connections of blocks 1705-2, 1705-1, and 1705-0 are enabled or disabled. In the embodiment of FIG. 18, each of the four adders has a corresponding one of a set of four Invert/Set/Propagate blocks ISP-3 1703-3, ISP-2 1703-2, ISP-1 1703-1, and ISP-0 1703-0 to support signed multiplication. Each ISP block receives two bits of the partial product value (e.g., ISP-3 1703-3 receives $PP^{7:6}$) and provides the PP bits following by a signed extension (up to adder size) N (e.g., $N^{15:12}$ as input to Adder-3 1703-3) at the specific accumulated cycle, in order to support signed multiplication. The ISP blocks ISP-3 1703-3, ISP-2 1703-2, ISP-1 1703-1, and ISP-0 1703-0 also receive the $M^{2:0}$ value specifying the precision mode so as to properly determine the signed extensions for the selected mode.

FIG. 19 is a table illustrating an embodiment for the multi-precision operational mode register values $M^{2:0}$ for enabling/disconnecting the cascaded adders for multi-precision computation and for control of the ISP blocks ISP-3 1703-3, ISP-2 1703-2, ISP-1 1703-1, and ISP-0 1703-0. The $M^{2:0}$ bits can be provided by the mode registers 313 of FIGS. 5, 6A, and 6B, as included in the control unit 1341 in the representation of FIG. 13, or as provided by another memory of the memory system or by a host, depending on the embodiment. The left column of FIG. 19 shows the values of the 3 bits of $M^{2:0}$, followed by columns for the corresponding mode, the bit-width for the weight and activation values, and the left shifter bit width. For full precision (FP) mode, the adder performs one 16-bit multiply-accumulate operation for one 8-bit weight and one 8-bit activation. In full precision mode, each of connections of blocks 1705-2, 1705-1, and 1705-0 are enabled by receiving a "1" for the corresponding bit of M, so that $M^{2:0}$=[111]. In full precision mode, the left shifter output is one 16-bit value.

For half precision (HP) mode, the adder performs two 8-bit multiply-accumulate operation for two 4-bit weight/4-bit activations. In half precision mode, each of connections of blocks 1705-2 and 1705-0 are enabled by receiving a "1" and 1705-1 is disabled by receiving a "0" for the corresponding bit of M, so that $M^{2:0}$=[101], In half precision mode, the left shifter output is two 8-bit values.

For quarter precision (QP) mode, the adder performs 4 4-bit multiply-accumulate operation for four 2-bit weight/2-bit activation multiplications. In quarter precision mode, each of connections of blocks 1705-2, 1705-1, and 1705-0 are disabled by receiving a "0" for the corresponding bit of M, so that $M^{2:0}$=[000], In quarter precision mode, the left shifter output is four 4-bit values.

Each of the four 4-bit adders, Adder-3 1701-3, Adder-2 1701-2, Adder-1 1701-1, and Adder-0 1701-0 also receives as input 4-bits of from the multi-mode left shift shifter 1721, respectively $S^{15:12}$, $S^{11:8}$, $S^{7:4}$, and $S^{3:0}$. The multi-mode left shift shifter 1721 receives the partial sum $PP^{15:0}$, which is left shifted in in response to the LSh signal from control unit 1341. The multi-mode left shift shifter 1721 also receives the mode value $M^{2:0}$ so as to perform the left shift as one 16-bit shift, two 8-bit shifts, or four 4-bit shifts. This is illustrated with respect to FIG. 20.

Figure 20:
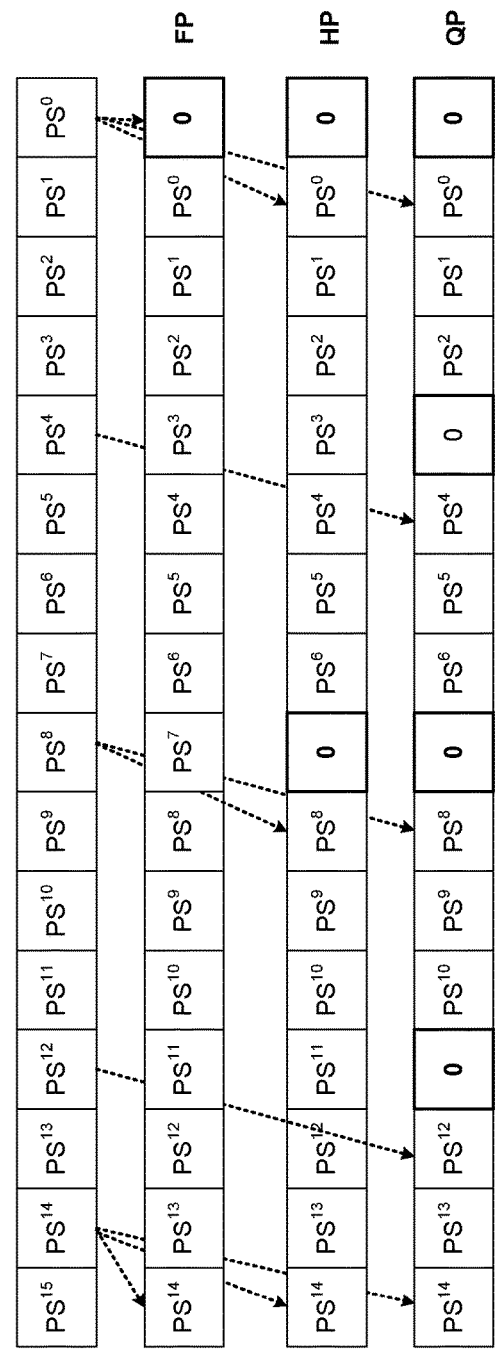

At its top row, FIG. 20 shows the 16 bits of the partial product $PP^{15:0}$ as received from the registers 1711, 1713, 1715, and 1717. The next three rows respectively illustrate how the left shift is implemented for full precision (FP), half precision (HP), and quarter precision (QP) to generate the values for $S^{15:0}$ that are input into the adders. For full precision, as illustrated in the second line of FIG. 20, a single 16-bit shift is performed in which all 16 are shifted one bit to the left, with $PS^{15}$ shifted out and a "0" added at the least significant bit. For half precision, as illustrated in the third line of FIG. 20, the 16 bits are split in half and two 8-bit shifts are performed: bits 15 to 8 are shifted one bit to the left, with $PS^{15}$ shifted out and a "0" added at the $8^{th}$ bit; and bits 7 to 0 are shifted one bit to the left, with $PS^7$ shifted out and a "0" added at the $0^{th}$ bit. For quarter precision, as illustrated in the fourth line of FIG. 20, the 16 bits are split in quarters and two 4-bit shifts are performed: bits 15 to 12 are shifted one bit to the left, with $PS^{15}$ shifted out and a "0" added at the $12^{th}$ bit; and bits 11 to 8 are shifted one bit to the left, with $PS^{11}$ shifted out and a "0" added at the $8^{th}$ bit, bits 7 to 4 are shifted one bit to the left, with $PS^7$ shifted out and a "0" added at the $4^{th}$ bit; and bits 3 to 0 are shifted one bit to the left, with $PS^3$ shifted out and a "0" added at the $0^{th}$ bit.

The arrangement of FIGS. 17-20 illustrates how the partial product multi-mode accumulate adder PPMA 1361 can be configured to handle 8-bit, 4-bit, or 2-bit weight values by use of the mode control signals $M^{2:0}$ associated with the weight. FIG. 21 provides more detail on the Partial Sum Multi-mode accumulate Adders PSMA 1363.

FIG. 21 is a block diagram for one embodiment of the PSMA block 1363 of FIG. 13. As in the embodiment for cascaded adders of PPMA in FIG. 18, PSMA 1701 again includes a set of four (N/4)-bit adders, Adder-3 2101-3, Adder-2 2101-2, Adder-1 2101-1, and Adder-0 2101-0 that can be operated as four (N/4)-bit adders or connected into two (N/2)-bit adders or one N-bit adders based upon which of the connections of blocks 2105-2, 2105-1, and 2105-0 are enabled or disabled. The connections of blocks 2105-2, 2105-1, and 2105-0 are again respectively enabled/disabled by the bits $M^2$, $M^1$, and $M^0$ of $M^{2:0}$. The output of each Adder-3 2101-3, Adder-2 2101-2, Adder-1 2101-1, and Adder-0 2101-0 is respectively stored in register 2109-3, 2109-2, 2109-1, and 2109-0. The output of the registers 2109-3, 2109-2, 2109-1, and 2109-0 collectively have the N-bit product output $P^{N\text{-}bit}$. Each of the adders 2101-3, 2101-2, 2101-1, and 2101-0 respectively receive the truncated partial sums $TPS^{7:6}$, $TPS^{5:4}$, $TPS^{3:2}$, and $TPS^{1:0}$ from the truncation block 1723 of FIG. 17. Each of the adders Adder-3 2101-3, Adder-2 2101-2, Adder-1 2101-1, and Adder-0 2101-0 also receive (N/4) bits of the product $P^{N\text{-}bit}$ as looped back from corresponding register 2109-3, 2109-2, 2109-1, and 2109-0.

The PSMA 1363 sums up the truncated partial sums $TPS^{7:0}$ into an output $P^{N\text{-}bit}$, where, as the PSMA 1363 sums up these values as an element-wise product, it does not require shifted unit. The size of cascaded adders Adder-3 2101-3, Adder-2 2101-2, Adder-1 2101-1, and Adder-0 2101-0 ((N/4)-bits) of PSMA 1363 depends on the total number of partial sums accumulated for each bit line. Large size adders avoid overflow, but suffer from more expensive cost. The output of PSMA 1363 can be truncated (for hardware optimization) before being sent to the next layer of the neural network.

FIG. 22 is a block diagram of a high-level architecture of a multi-precision compute in memory DNN. In FIG. 22, a non-volatile memory device 2250 includes a memory die 2210 of multiple memory blocks, including a general SCM-based memory portion of blocks 2211, of which four are shown, and a multi-precision inference in-memory DNN inference engine portion of blocks 2213. Each of the blocks of section 2213 can be operated to compute in-memory the multiple and accumulate operations of a DNN as described above with respect to FIGS. 12-21. The memory die 2210 of FIG. 22 only represents the memory blocks, but can also include additional peripheral/control elements of FIGS. 5 and 6A.

In addition to the one or more control circuits that generate the product values from the integrated circuit of memory die 2210, other elements on the memory device (such as on the controller 102) are a unified buffer 2253 that can buffer being transferred from the host device 2291 to the memory die 2210 and also receive data from the memory die 2210 being transferred from to the host device 2291. For use in inferencing, neural network operations such as activation, batch normalization, and max pooling 2251 can be performed by processing on the controller for data from the memory die 2210 before it is passed on to the unified buffer 2253. Scheduling logic 2255 can oversee the inferencing operations.

In the embodiment of FIG. 22, the memory die 2210 is storage class memory, but other embodiments can be NAND memory or based on other memory technologies. In the embodiment of FIG. 22, the memory die includes a number of SCM memory blocks or sub-arrays that are configured to operate as a multi-precision in-memory DNN inference engine 2213. The same integrated circuit can also include another section 2211 with a number of blocks 2211-a, 2211-b, 2211-c, 2211-d, . . . that can work as basic memory and can be employed, for example, as buffers in multiple layer neural network or a large neural network that cannot fit in a single memory device. The embodiment of FIG. 22 can be referred to as having inter-chip heterogenous functions. In alternate embodiments, an intra-chip heterogenous arrangement of multiple memory die chips can be used, were some chips support DNN inference, while others are basic memory, or where the two variations can be combined.

Within the multi-precision in-memory DNN inference engine 2213 portion are a number of memory blocks, where these can be separate memory arrays or blocks with a common array. Each of the blocks in section 2213 can independently be configured to store memory weights of a selected precision based on a corresponding mode-control signal stored a mode register or supplied by the host, where a corresponding mode-control signal $M^{2:0}$ value for each block can be maintained in a register on the memory die, such as in mode registers 313 of FIG. 5 or 6A, as register values on a controller of the memory system (e.g., controller 102 of FIG. 1), or on the host device 2291. Consequently, on the same memory chip (integrated circuit) of memory die 2210 different blocks can be configured to store weights, and perform inferencing operations, of multiple degrees of precision. For example, in the CNN inference engine section 2213 of memory die 2210, of M×N blocks, including blocks configured to store and perform multiply-accumulation operations with 8-bit weights (block (1,1) 2213-a, block (1,N) 2213-b), 4-bit weights (block (M,1) 2213-c) and 2-bit weights (block (M,N) 2213-d).

Under the arrangement of FIG. 22, the weight matrices of the neural layers are mapped to the blocks that can be configured with different precisions which are pre-determined after a quantization-aware training phase. Digital logic on the host, on the memory circuit, or a combination of these can perform bit extension or bit truncation to compromise the precision of activation required for intra-block data propagation in an inference operation. This arrangement can use layers of a neural network to be quantized at different bit precisions in order to improve computation throughput, memory utilization and energy efficiency with acceptable or zero accuracy loss.

FIG. 23 is a flowchart for one embodiment for operation of a multi-precision compute in memory DNN inference engine to perform element-wise vector multiplication based on the structures described above with respect to FIGS. 12-22. In FIG. 23, steps 2301-2305 relate to entering in weight values for a neural network that has already been trained, followed by an inferencing operation beginning as step 2307. In other embodiments, the training can be performed using the array architecture described above, in which case the weights programmed into the array may not be the final weight values for the network, but weight values at an intermediate stage of the training process.

At step 2301, a set of weights for a neural network are received, where the weights can be for a DNN, as is the primary focus here, or other neural network. Each of the weights will also have some level of precision, where the corresponding precision level of each weight can also be supplied with the weight (such as a mode-control signal $M^{2:0}$ value or in other format) or determined by examining the weight value (i.e., the number bits for the weight value). For example, when weight values for the DNN or other neural network are received a host, the controller or the memory die could examine the weights to determine the number of bits each contains and generate a corresponding value for $M^{2:0}$. The number of bits in a weight value (such as 8-bit (full precision), 4-bit (half precision), or 2-bit (quarter precision) in the examples above) will determine how it is written into blocks of the memory die and at step 2303 the memory is configured accordingly. For example, full precision weight values can be assigned to one set of blocks (such as 2213-1,1 of FIG. 22) while another set of blocks (such as 2213-M,1) is used to store half precision weight values. Step 2305 then programs the weights into the memory cells of the block or blocks and also saves the corresponding mode control signals. Depending on the embodiment, the mode control signals (e.g., $M^{2:0}$ in the above embodiments) can be on a per block basis, if all weights of a given block are of the same level of precision, or on a per weight basis, if weights of differing precision are stored in the same block. Depending on the embodiment, the mode control signals can be stored on the memory circuit, such as in the mode registers 313 of FIG. 5 or 6A that form part of the one or more control circuits for the inferencing operation, on the controller 102, or in other memory device of the memory system (such as on another memory device of the system storing system level data), or maintained by the host.

An inferencing operation using the stored weights begins at step 2307 with the reading out or receiving of the mode control signals, where, depending on the embodiment, the needed mode control signals could read out of the mode registers 313 of FIG. 5 or 6A or supplied to the memory die along with the input (activation) values for the inference operation. At step 2309 bit lines (such $BL^k$ 1313-$k$ of FIG. 13) of the block or blocks involved in the inferencing are pre-charged, along with other needed array biasing. For example, in an embodiment based on a NAND memory technology, non-selected word lines and select gates for the NAND string would be biased to be in on state. At step 2311 the activation bits are encoded as voltage levels that are sequentially applied to the word lines (such WU 1311-$j$ of FIG. 13) to perform the in memory bit-wise multiplication of the input, or activation, values with the weight values. The one or more control circuits involved in these steps can include the row decode circuits 324, including word line drivers, the read/write circuits 328, and the state machine 312 and other control element in the on-chip control circuits of block 310.

Based on the biasing of word lines and bit lines for the memory access at steps 2309 and 2311, the currents generated on the bit lines are read out as multiple partial products by the single-bit sense amplifiers (350 in FIGS. 5 and 6A, 1350 in the more detailed FIG. 13), with the partial products being accumulated by the partial product multi-mode accumulated adders PPMA 1361 of FIG. 13, and as described in more detail with respect to FIGS. 17-20, at step 2315. At step 2317 the partial sums of one activation (input) value and multiple weight values are obtained.

Steps 2311, 2313, 2315, and 2317 are part of a loop to cover all of the bit values and are performed for 2, 4, or 8 iterations for 2-, 4-, or 8-bit width, respectively, in the embodiments above. Step 2319 determines whether there are more iterations to perform and, if so, the flow loops back to step 2311; and, if not, the flow continues on to step 2321 once the iterations are complete.

At step 2321 the partial sums are accumulated in the partial sum multi-mode accumulated adder PSMA 1363 of FIG. 13 and as described in more detail with respect to FIG. 21. This leads to step 2323 in which the element-wise vector multiplication between the set of weights is achieved. An activation (input) matrix will typically have multiple rows that need to be computed. Step 2325 determines whether all of the rows of the activation matrix have been completely computed and, if not, the flow loops back to step 2311 for the next row; if so, then the flow continues to step 2327, at which point all elements of the element-wise vector multiplication is achieved.

The steps 2311-2325 can be performed as a pipelined process, where the control logic of the one or more control circuits, including the control unit 1341 of FIG. 13 and the additional control circuit elements of FIGS. 5 and 6A, can be designed to support pipelined execution for memory access, PPMA 1361, PSMA 1363, and the other memory device elements in order to maximize throughout. The hardware implementation of the digital adders of PPMA 1361 and PSMA 1363 can be minimized under performance, power, and area constrains since they are not in the critical paths by use of low-complexity architectures (i.e. cascaded adders) and by use of optimized physical cells or full-custom design.

According to a first set of aspects, a non-volatile memory device includes a memory array of a plurality of non-volatile memory cells connected along bit lines and word lines, each of the memory cells configured to store a bit of a multi-bit valued weight of a layer of a neural network. A plurality of sense amplifiers are each connected one of the bit lines and configured to provide a binary output value. A plurality of adders are connected to receive output values of the sense amplifiers and to receive a mode signal, where the adders are configurable to perform an accumulation operation of one of a plurality of settable levels of precision in response to the mode signal. One or more control circuits are connected to the memory array and the adders. The one or more control circuits are configured to: perform an in-array multiplication between a multi-bit valued input of the layer of the neural network with the weight of the layer of neural by applying the bits of the input as binary inputs along word lines of the memory array; supply the mode signal to configure the adders to set the level of precision for the adders; and perform an accumulation operation by the adders of the output values of the sense amplifiers in response to the in-array multiplication at the set level of precision.

In another set of aspects, a non-volatile memory device includes a plurality of first memory arrays of non-volatile memory cells and one or more control circuits connected to the plurality of first memory arrays. The memory cells of each of the first memory arrays are each configured to store a bit of a multi-bit value of a weight of a neural network. The one or more control circuits are configured to: independently configure each of the first memory arrays to a corresponding one of a plurality precision levels; store weight values of neural network in one or more of the first memory arrays with the corresponding level of precision; and perform one or more in-array multiplication and accumulation operations between multi-bit input values of the neural network and the weight values neural network in each of the first memory arrays with the corresponding level of precision.

In additional aspects, a method includes performing an in-array multiplication between a multi-bit valued input of a layer of a neural network and a multi-bit valued set of weights of the layer of neural by applying the bits of the input as binary inputs along word lines of a memory array. The memory array includes a plurality of memory cells each configured to store a bit of the multi-bit valued set of weights of a layer of a neural network. The method also includes configuring a plurality of adders to perform an accumulation operation of results of the in-array multiplication with of one a plurality of settable levels of precision and performing the accumulation operation by the adders of the results of the in-array multiplication at the set level of precision.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory device, comprising:
    a memory array of a plurality of non-volatile memory cells connected along bit lines and word lines, each of the memory cells configured to store a bit of a multi-bit valued weight of a layer of a neural network;
    a plurality of sense amplifiers each connected one of the bit lines and configured to provide a binary output value;
    a plurality of adders connected to receive output values of the sense amplifiers and to receive a mode signal, the adders configurable to perform an accumulation operation of one of a plurality of settable levels of precision in response to the mode signal; and
    one or more control circuits connected to the memory array and the adders, the one or more control circuits configured to:
        perform an in-array multiplication between a multi-bit valued input of the layer of the neural network with the weight of the layer of neural by applying the bits of the input as binary inputs along word lines of the memory array;
        supply the mode signal to configure the adders to set the level of precision for the adders; and
        perform an accumulation operation by the adders of the output values of the sense amplifiers in response to the in-array multiplication at the set level of precision.

2. The non-volatile memory device claim 1, comprising:
    a bonded die pair, comprising:
        a memory die including the memory array; and
        a control die, formed separately from and bonded to the memory die and including the plurality of sense amplifiers, the plurality of adders, and the one or more control circuits.

3. The non-volatile memory device of claim 1, wherein:
    the memory array is formed of storage class memory cells.

4. The non-volatile memory device of claim 1, wherein:
    the memory array is NAND memory array.

5. The non-volatile memory device of claim 1, wherein the plurality of adders comprises:
    one or more first adders each configured to receive the output values of the sense amplifiers and generate a plurality of partial sums therefrom; and
    one or more second adders configured to receive the plurality of partial sums and generate therefrom a value for components of an output of the layer of the neural network with the set level of precision.

6. The non-volatile memory device of claim 5, wherein:
    each of the one or more first adders comprise a plurality of cascaded adders configurable to be connected with the settable level of precision in response to the mode signal; and
    each of the one or more second adders comprise a plurality of cascaded adders configurable to be connected with the settable level of precision in response to the mode signal.

7. The non-volatile memory device of claim 1, wherein:
    the mode signal includes values corresponding to a multi-bit valued weight and a multi-bit input of 2-bits, 4-bits, and 8-bits.

8. The non-volatile memory device of claim 1, wherein the settable levels of precision include full precision, half precision, and quarter precision.

9. The non-volatile memory device of claim 8, wherein the one or more control circuits are configured to perform the half precision level with higher throughput than the full precision level and to perform the quarter precision level with higher throughput than the half precision level.

10. The non-volatile memory device of claim 1, further comprising:
    a register configured to store the mode signal, wherein the one or more control circuits are configured to supply the mode signal by reading the register.

11. A method, comprising:
    performing an in-array multiplication between a multi-bit valued input of a layer of a neural network and a multi-bit valued set of weights of the layer of neural by applying the bits of the input as binary inputs along word lines of a memory array, the memory array comprising a plurality of memory cells each configured to store a bit of the multi-bit valued set of weights of a layer of a neural network;

configuring a plurality of adders to perform an accumulation operation of results of the in-array multiplication with of one a plurality of settable levels of precision; and performing the accumulation operation by the adders of the results of the in-array multiplication at the set level of precision.

12. The method of claim 11, wherein configuring the plurality of adders comprises:

for each of the adders, reading a corresponding mode value from a register on a memory device including the memory array; and configuring each of the plurality of adders according to the corresponding mode value.

13. The method of claim 12, further comprising, prior to performing the in-array multiplication:

receiving the multi-bit valued set of weights of the layer;

receiving a mode value corresponding to the number of bits of the set of weights of the layer;

configuring the memory array in response to the mode values;

programming the set of weights of the layer into configured memory array; and storing the mode value in the register.

14. The method of claim 11, wherein the plurality of adders comprises one or more first adders and one or more second adders and configuring the plurality of adders comprises:

configuring each of the one or more first adders to receive the output values of the sense amplifiers and generate a plurality of partial sums therefrom; and configuring each of the one or more second adders to receive the plurality of partial sums and generate therefrom a value for components of an output of the layer of the neural network with the set level of precision.

15. The method of claim 14, wherein each of the one or more first adders comprise a plurality of cascaded adders and each of the one or more second adders comprise a plurality of cascaded adders, the method further comprising:

receiving a mode signal, wherein configuring each of the one or more first adders includes configuring each of the one or more first adders with the settable level of precision in response to the mode signal, and wherein configuring each of the one or more second adders includes wherein configuring with the settable level of precision in response to the mode signal.

16. The method of claim 11, wherein further comprising:

receiving a mode signal, wherein the plurality of adders are configured in response to the mode signal, the mode signal including values corresponding to a multi-bit valued weight and a multi-bit input of 2-bits, 4-bits, and 8-bits.

17. The method of claim 11, wherein the settable levels of precision include full precision, half precision, and quarter precision.

18. The method of claim 17, wherein the method performs the multiplication at the half precision level with higher throughput than the method performs the multiplication at the full precision level, and the method performs the multiplication at the quarter precision level with higher throughput than the method performs the multiplication at the half precision level.

* * * * *